(12) United States Patent
Liu et al.

(10) Patent No.: US 11,991,040 B2
(45) Date of Patent: May 21, 2024

(54) NETWORK CONFIGURATION METHOD AND DEVICE

(71) Applicant: Huawei Technologies Co., Ltd., Shenzhen (CN)

(72) Inventors: Banghong Liu, Hangzhou (CN); Chengzhen Wan, Hangzhou (CN); Mingxiu Zhang, Hangzhou (CN); Haibin Han, Hangzhou (CN); Yuepeng Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/182,112

(22) Filed: Mar. 10, 2023

(65) Prior Publication Data
US 2023/0216732 A1 Jul. 6, 2023

Related U.S. Application Data

(63) Continuation of application No. PCT/CN2021/113128, filed on Aug. 17, 2021.

(30) Foreign Application Priority Data

Sep. 10, 2020 (CN) .......................... 202010949897.8
Sep. 30, 2020 (CN) .......................... 202011063605.7

(51) Int. Cl.
G06F 15/177 (2006.01)
G06F 9/54 (2006.01)
H04L 41/0803 (2022.01)

(52) U.S. Cl.
CPC ............ H04L 41/0803 (2013.01); G06F 9/54 (2013.01)

(58) Field of Classification Search
CPC . H04L 41/0803; H04L 41/0806; H04L 67/00; H04L 67/12; H04L 67/146;
(Continued)

(56) References Cited

U.S. PATENT DOCUMENTS 10,169,626 B2* 1/2019 Britt .................. G06K 7/10257
11,792,455 B1* 10/2023 Fu ...................... H04N 21/2387
315/297
(Continued)

FOREIGN PATENT DOCUMENTS

CN 105578561 A 5/2016
CN 105785786 A 7/2016
(Continued)

OTHER PUBLICATIONS

"Candy"; "How to add EasyN HD camera in app, most common solution for any HD camera", 25 pages (Year: 2015).*

Primary Examiner — Richard G Keehn
(74) Attorney, Agent, or Firm — Conley Rose, P.C.

(57) ABSTRACT

A network configuration method includes: obtaining, by a first application of a mobile device, label information of an internet of things device to be network-configured; obtaining, by the first application, information about a second application that is for configuring a network for the internet of things device; sending, by the first application, a first message to a first service of the mobile device, wherein the first message indicates to start the first service and comprises the information about the second application; discovering, by the first service, the internet of things device to be network-configured; sending, by the first service, a second message to a second service of the mobile device, wherein the second message indicates to start the second application and comprises the information about the second application;
(Continued)

and starting, by the second service, the second application based on the second message.

20 Claims, 31 Drawing Sheets

(58) Field of Classification Search
CPC .......... H04L 67/34; G06F 9/54; G06F 9/485; Y02D 30/70
See application file for complete search history.

(56) References Cited

U.S. PATENT DOCUMENTS

| | | | |
|---|---|---|---|
| 2013/0111328 A1 | 5/2013 | Khanna et al. | |
| 2017/0034700 A1* | 2/2017 | Cohen | H04W 12/50 |
| 2017/0171607 A1* | 6/2017 | Britt | H04W 4/80 |
| 2018/0035479 A1 | 2/2018 | Lee et al. | |
| 2018/0109418 A1* | 4/2018 | Cammarota | H04W 12/50 |
| 2018/0367539 A1 | 12/2018 | Huang et al. | |
| 2023/0068641 A1 | 3/2023 | Lu et al. | |

FOREIGN PATENT DOCUMENTS

| | | | | |
|---|---|---|---|---|
| CN | 106332224 A | | 1/2017 | |
| CN | 107251530 A | * | 10/2017 | ............. G05B 15/02 |
| CN | 107613544 A | | 1/2018 | |
| CN | 108111375 A | | 6/2018 | |
| CN | 108259551 A | * | 7/2018 | ............. H04L 67/12 |
| CN | 108366006 A | | 8/2018 | |
| CN | 109921943 A | | 6/2019 | |
| CN | 110752976 A | | 2/2020 | |
| CN | 111077788 A | | 4/2020 | |
| CN | 111246545 A | | 6/2020 | |
| WO | 2020168569 A1 | | 8/2020 | |
| WO | 2020223854 A1 | | 11/2020 | |

* cited by examiner

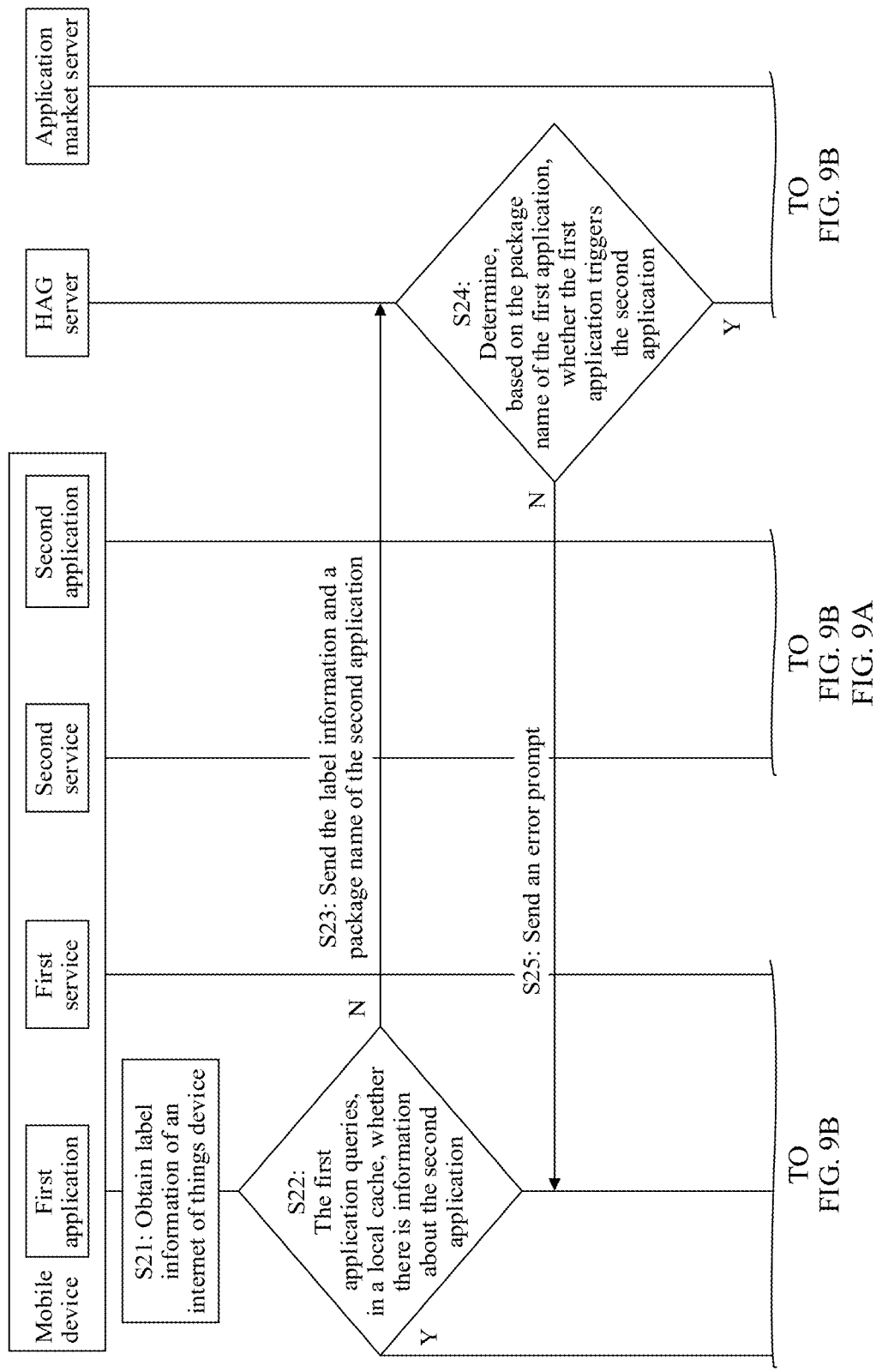

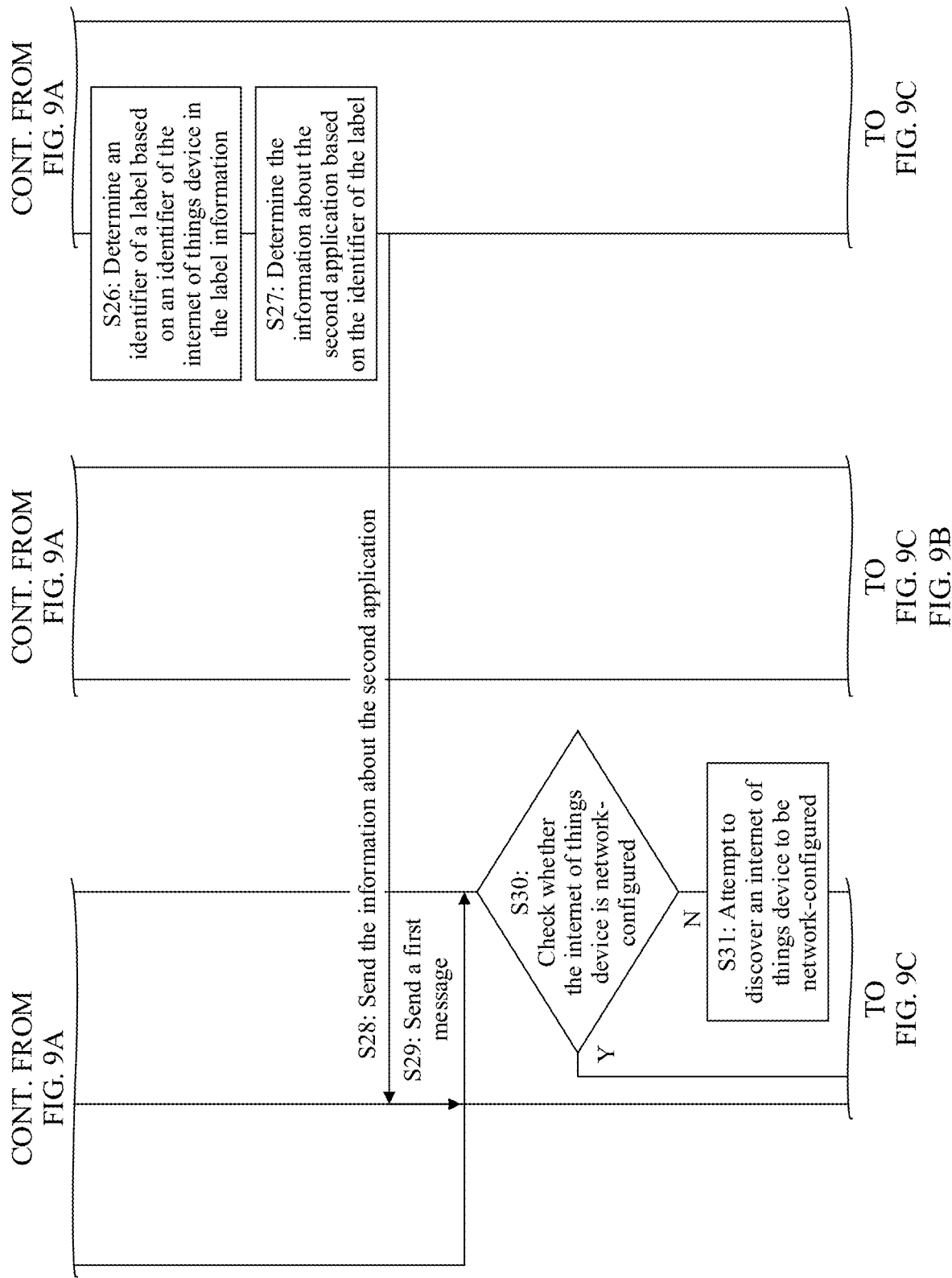

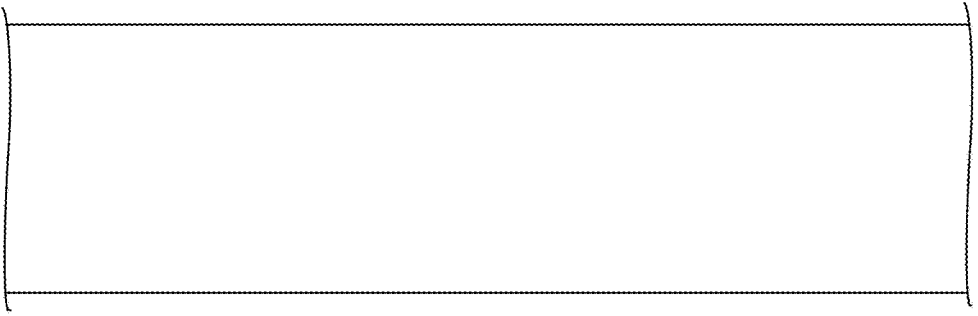
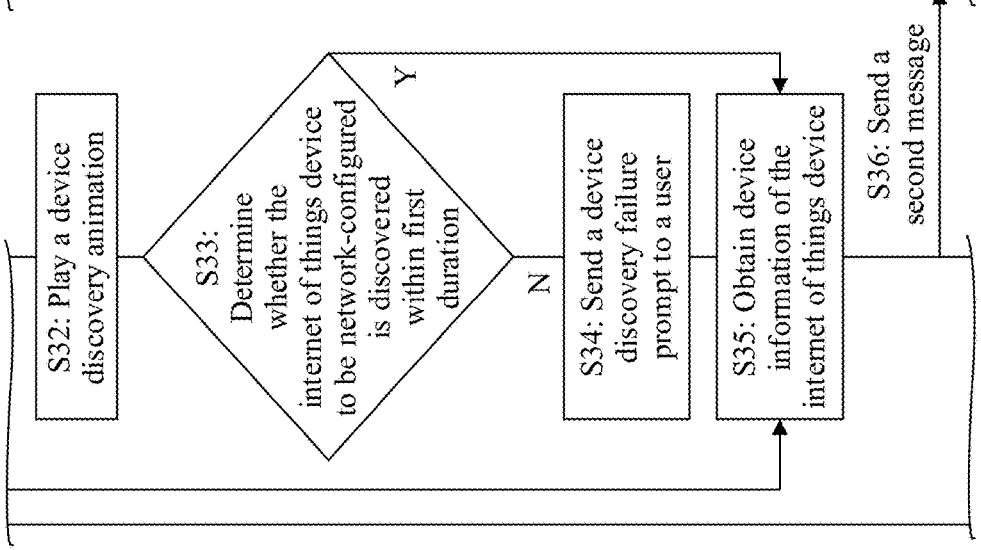

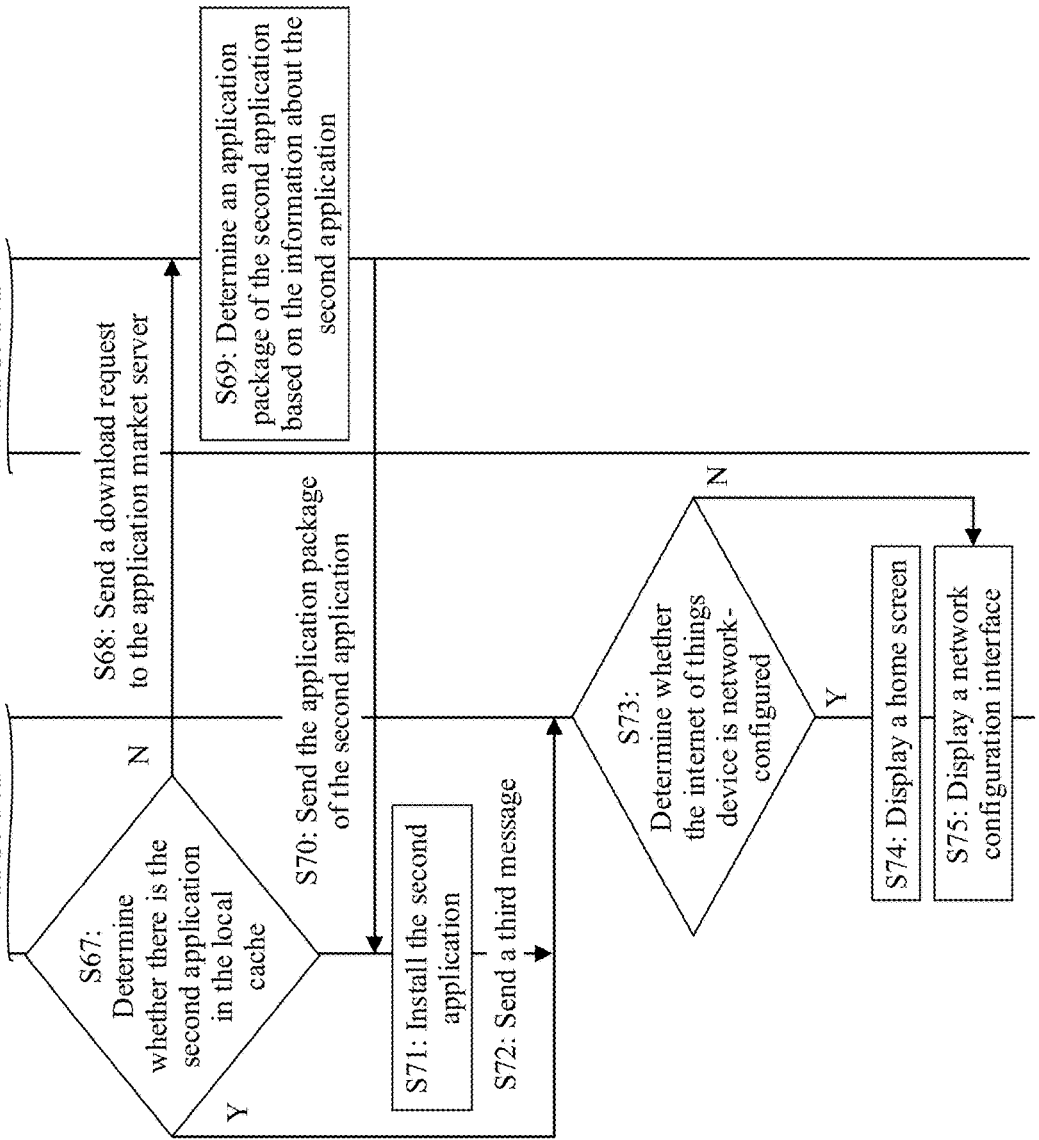

NETWORK CONFIGURATION METHOD AND DEVICE

CROSS-REFERENCE TO RELATED APPLICATIONS

This is a continuation of International Patent Application No. PCT/CN2021/113128 filed on Aug. 17, 2021, which claims priority to Chinese Patent Application No. 202010949897.8 filed on Sep. 10, 2020 and Chinese Patent Application No. 202011063605.7 filed on Sep. 30, 2020. All of the aforementioned patent applications are hereby incorporated by reference in their entireties.

TECHNICAL FIELD

This application relates to the field of communication technologies, and in particular, to a network configuration method and device.

BACKGROUND

With development of internet of things technologies, various internet of things devices emerge. For example, a smart home environment usually includes internet of things devices such as an audio/video device, a lighting system, an air conditioner control device, and an internet appliance. A Wi-Fi module is usually configured in the internet of things device, and is able to access a Wi-Fi network. Before using an internet of things device, a user usually needs to perform visualized network configuration on the internet of things device by using a terminal device such as a mobile phone, to enable the internet of things device to access a Wi-Fi network to facilitate subsequent control and operations on the internet of things device.

In a related network configuration manner of an internet of things device, a terminal device such as a mobile phone needs to first download and install a network configuration application corresponding to the internet of things device, and then operate the network configuration application corresponding to the internet of things device, so that the internet of things device to be network-configured is in a network configuration mode. Then, a to-be-configured network is determined in the network configuration application corresponding to the internet of things device, and a password of the to-be-configured network is entered to complete a network configuration operation.

However, in the related network configuration manner of the internet of things device, in a network configuration process, the user needs to manually download and install a network configuration application on a mobile device. The network configuration process is complex, and a network configuration speed is low, resulting in poor user experience.

SUMMARY

To resolve the foregoing problem, embodiments of this application provide a network configuration method and device, to resolve a technical problem in the conventional technology that a network configuration process is complex.

A first aspect of this application provides a network configuration method, applied to a mobile device. The mobile device includes a first application, a first service, and a second service. The network configuration method includes: The first application first obtains label information of an internet of things device to be network-configured, and then obtains information about a second application. The second application is used to configure a network for the internet of things device. Then, the first application sends a first message to the first service. The first message indicates to start the first service. The first message includes the information about the second application. Next, the first service discovers the internet of things device to be network-configured, and sends a second message to the second service. The second message indicates to start the second application. The second message includes the information about the second application. Finally, the second service starts the second application based on the second message. The first application may obtain, through near-field communication (NFC), the label information of the internet of things device to be network-configured. Correspondingly, the first application may be an NFC reading application.

According to the network configuration method provided in this application, a user does not need to manually operate the mobile device when performing a network configuration operation, so that the second application can be downloaded without awareness of the user to control the internet of things device and perform network configuration on the internet of things device.

In a possible design, before the first application obtains the information about the second application, the first application may further send an information obtaining request for the second application to a first server. The information obtaining request includes the label information of the internet of things device. The first server may be, for example, a server of a service management system (HAG).

In a possible design, the information obtaining request further includes a package name of the first application. The package name of the first application is used to verify whether the first application has permission to trigger the second application.

In this possible design, when receiving the information obtaining request for the second application, the first server may first verify the package name of the first application, and the second application may be triggered only when an application that has permission to trigger the second application is preset in the server. Therefore, a triggering manner of the second application is controlled.

In a possible design, after the first application sends the information obtaining request for the second application to the first server, the first application may further receive an error prompt sent by the first server. The error prompt is sent to the first application after the first server determines that the first application has no permission to trigger the second application. The error prompt indicates that the first application has no permission to trigger the second application.

In a possible design, after the first application sends the information obtaining request for the second application to the first server, the first application receives the information, sent by the first server, about the second application. The information about the second application is sent to the first application after the first server determines that the first application has the permission to trigger the second application. The information about the second application is used to determine an application package of the second application.

In a possible design, that the first application sends a first message to the first service may include: The first application sends the first message to the first service through a first interface.

In a possible design, after the first application sends the first message to the first service, the first service determines whether the internet of things device is network-configured. If it is determined that the internet of things device is not network-configured, the first service discovers the internet of things device to be network-configured.

In a possible design, that the first service discovers the internet of things device to be network-configured may include: The first service searches for the internet of things device to be network-configured, and establishes a connection between the first service and the internet of things device to be network-configured.

In a possible design, that the first service discovers the internet of things device to be network-configured may further include: The first service may play a device discovery animation.

In this possible design, the first service may play the device discovery animation to notify the user that the first service is discovering the internet of things device to remind the user to keep contact between the mobile device and the internet of things device. Therefore, it can be ensured that the first service can accurately discover the internet of things device.

In a possible design, after the first service determines whether the internet of things device is network-configured, if it is determined that the internet of things device is network-configured, the first service sends an information obtaining request to the internet of things device. Alternatively, if the first service discovers the internet of things device to be network-configured, the first service sends the information obtaining request to the internet of things device. The first service receives information, sent by the internet of things device, about the internet of things device. The information about the internet of things device includes a serial number of the internet of things device, a session control identifier of the internet of things device, and a product identifier of the internet of things device.

In a possible design, the second message further includes the information about the internet of things device.

In a possible design, before the second service starts the second application based on the second message, the second service sends the information about the internet of things device to the second application, and then starts the second application. The second application determines whether the internet of things device is network-configured. If the second application determines that the internet of things device is not network-configured, the second application displays a network configuration interface. The network configuration interface is displayed. A network configuration mode may be triggered in multiple manners. For example, the user double-clicks a power button of the internet of things device, the user presses and holds a power button of the internet of things device, or the user sends, to the internet of things device, a voice instruction for entering the network configuration mode.

For first network configuration by the user, the user may enter a network configuration account and password on a network configuration page to complete network configuration. Then, the second application may cache the network configuration account and the password, or may store the network configuration account and the password in a cloud, for example, in the first server, a second server, or a third server. Subsequently, after the internet of things device enters the network configuration page again, the second application may fill in the network configuration page by querying historical network configuration data stored locally or in the cloud. This avoids a trouble that the user repeatedly enters the network configuration account and the password.

In a possible design, if the second application determines that the internet of things device is network-configured, the second application displays a home screen of the internet of things device.

In a possible design, before the second application displays the network configuration interface, the second application may request to obtain historical network configuration information of the internet of things device from the third server. The historical network configuration information includes the network configuration account and the password of the network configuration account. Then, the second application receives a third message sent by the third server. The third message carries the network configuration account and the password of the network configuration account. The third message is sent to the second application after the third server determines that the historical network configuration information of the internet of things device is stored. Finally, the second application displays the network configuration interface in response to receiving the third message. The network configuration interface displays the network configuration account and the password of the network configuration account.

The third server may be the first server, may be the second server, or may be a server of an internet of things device vendor. The network configuration account may be an account of a wireless network configured for the internet of things device. The network configuration account and the password of the network configuration account that are carried in the third message may be a latest stored network configuration account and a latest stored password of the network configuration account. Before the second application requests to obtain the historical network configuration information of the internet of things device from the third server, the second application may attempt to obtain the historical network configuration information from a local cache, and if the historical network configuration information is successfully obtained from the local cache, does not need to request to obtain the historical network configuration information of the internet of things device from the third server. In addition, if there is no historical network configuration information in the third server, the third message sent to the second application is empty.

In this possible design, during network configuration, the second application requests to obtain the historical network configuration information of the internet of things device from the third server, so that the second application may automatically fill in the network configuration page with the network configuration account and the password of the network configuration account in the historical network configuration information. This prevents the user from repeatedly entering the network configuration account and the password of the network configuration account, accelerates network configuration, and improves user experience.

In a possible design, that the first service sends a second message to the second service may include: The first service sends the second message to the second service through a second interface.

In a possible design, that the second service starts the second application based on the second message may include: The second service determines, based on the information about the second application, whether there is the second application in a local cache of the mobile device. If yes, the second service starts the second application in the local cache of the mobile device.

In this possible implementation, the second service may preferentially start the second application in the local cache, thereby reducing time for downloading and installing the second application, reducing network configuration time, and increasing a network configuration speed.

In a possible design, after the second service of the mobile device determines whether there is the first application in the local cache of the mobile device, if no, the second service sends a download request to a second server. The download request is used to request to download the second application. The download request includes the information about the second application. Subsequently, the second service receives an application package, sent by the second server, of the first application. Then, the second service starts the second application.

In a possible design, the network configuration interface of the second application includes a first control. The second application receives a first operation performed by a user on the first control. Subsequently, the second application opens a network details interface in response to the first operation. The network details interface displays a locally available network found by the mobile device. For example, the first control may be, for example, a "Display advanced options" button.

In a possible design, recommended network information is further marked in the network details interface. The recommended network information is used to represent a recommended network. For example, the recommended network information in this application is marked on a local network by using a word "Recommended network".

In a possible design, the network details interface includes a second control corresponding to a target network. The second application receives a second operation performed by the user on the second control. Then, the second application expands, in response to the second operation, a folded information area of the target network in the network details interface. The folded information area includes historical configuration data of the target network. For example, the second control may be, for example, a details button after the locally available network.

In a possible design, the label information of the internet of things device includes an identifier of the internet of things device.

In a possible design, the information about the second application includes an application name of the second application and a download address of the second application.

A second aspect of this application provides a network configuration method, applied to a first server. The network configuration method includes: The first server first receives an information obtaining request, sent by a first application of a mobile device, for a second application. The information obtaining request includes label information of an internet of things device. The second application is used to configure a network for the internet of things device. Then, the first server determines information about the second application based on the label information. Finally, the first server sends the information about the second application to a first application.

In a possible design, that the first server determines information about the second application based on the label information includes: The first server first determines an identifier of a label based on an identifier of the internet of things device in the label information. Then, the first server determines the information about the second application based on the identifier of the label.

In a possible design, the information obtaining request further includes a package name of the first application. Before the first server determines the information about the second application based on the label information, the first server may determine, based on the package name of the first application, whether the first application has permission to trigger the second application. If yes, the first server determines the information about the second application based on the label information.

In a possible design, after the first server determines, based on the package name of the first application, whether the first application has the permission to trigger the second application, if no, the first server sends an error prompt to the first application. The error prompt indicates that the first application has no permission to trigger the second application.

A third aspect of this application provides a network configuration method, applied to a mobile device. The mobile device includes a first application, a first service, and a second service. The method includes: The first application obtains label information of an internet of things device to be network-configured. The first application sends a first message to the first service. The first message indicates to start the first service. The first message includes the label information of the internet of things device. The first service obtains information about a second application. The second application is used to configure a network for the internet of things device. The first service discovers the internet of things device to be network-configured. The first service sends a second message to the second service. The second message indicates to start the second application. The second message includes the information about the second application. The second service starts the second application based on the second message.

In a possible design, before the first service obtains the information about the second application, the method further includes: The first service sends an information obtaining request for the second application to a first server. The information obtaining request includes the label information of the internet of things device.

In a possible design, the information obtaining request further includes a package name of the first application. The package name of the first application is used to verify whether the first application has permission to trigger the second application.

In a possible design, after the first service sends the information obtaining request for the second application to the first server, the method further includes: The first service receives an error prompt sent by the first server. The error prompt is sent to the first service after the first server determines that the first application has no permission to trigger the second application. The error prompt indicates that the first application has no permission to trigger the second application.

In a possible design, after the first service sends the information obtaining request for the second application to the first server, the method further includes: The first service receives the information, sent by the first server, about the second application. The information about the second application is sent to the first service after the first server determines that the first application has the permission to trigger the second application. The information about the second application is used to determine an application package of the second application.

In a possible design, that the first application sends a first message to the first service includes: The first application sends the first message to the first service through a first interface.

In a possible design, after the first application sends the first message to the first service, the method further includes: The first service determines whether the internet of things device is network-configured. That the first service discovers the internet of things device to be network-configured includes: If it is determined that the internet of things device is not network-configured, the first service discovers the internet of things device to be network-configured.

In a possible design, that the first service discovers the internet of things device to be network-configured includes: The first service searches for the internet of things device to be network-configured, and establishes a connection between the first service and the internet of things device to be network-configured.

In a possible design, that the first service discovers the internet of things device to be network-configured further includes: The first service plays a device discovery animation.

In a possible design, after the first service determines whether the internet of things device is network-configured, the method further includes: If it is determined that the internet of things device is network-configured, the first service sends an information obtaining request to the internet of things device. Alternatively, if the first service discovers the internet of things device to be network-configured, the first service sends the information obtaining request to the internet of things device. The first service receives information, sent by the internet of things device, about the internet of things device. The information about the internet of things device includes a serial number of the internet of things device, a session control identifier of the internet of things device, and a product identifier of the internet of things device.

In a possible design, the second message further includes the information about the internet of things device.

In a possible design, before the second service starts the second application based on the second message, the method further includes: The second service sends the information about the internet of things device to the second application. The method further includes: starting the second application; determining, by the second application, whether the internet of things device is network-configured; and if the second determines that the internet of things device is not network-configured, displaying, by the second application, a network configuration interface.

In a possible design, the method further includes: If the second application determines that the internet of things device is network-configured, the second application displays a home screen of the internet of things device.

In a possible design, before the second application displays the network configuration interface, the method further includes: The second application requests to obtain historical network configuration information of the internet of things device from a third server. The historical network configuration information includes a network configuration account and a password of the network configuration account. The second application receives a third message sent by the third server. The third message carries the network configuration account and the password of the network configuration account. The third message is sent to the second application after the third server determines that the historical network configuration information of the internet of things device is stored. That the second application displays a network configuration interface is specifically as follows: The second application displays the network configuration interface in response to receiving the third message. The network configuration interface displays the network configuration account and the password of the network configuration account.

In a possible design, that the first service sends a second message to the second service includes: The first service sends the second message to the second service through a second interface.

In a possible design, that the second service starts the second application based on the second message includes: The second service determines, based on the information about the second application, whether there is the second application in a local cache of the mobile device. If yes, the second service starts the second application in the local cache of the mobile device.

In a possible design, after the second service of the mobile device determines whether there is the first application in the local cache of the mobile device, the method further includes: If no, the second service sends a download request to a second server. The download request is used to request to download the second application. The download request includes the information about the second application. The second service receives an application package, sent by the second server, of the first application. The second service starts the second application.

In a possible design, the network configuration interface of the second application includes a first control. The method further includes: The second application receives a first operation performed by a user on the first control. The second application opens a network details interface in response to the first operation. The network details interface displays a locally available network found by the mobile device.

In a possible design, recommended network information is further marked in the network details interface.

In a possible design, the network details interface includes a second control corresponding to a target network. The method further includes: The second application receives a second operation performed by the user on the second control. The second application expands, in response to the second operation, a folded information area of the target network in the network details interface. The folded information area includes historical configuration data of the target network.

In a possible design, the label information of the internet of things device includes an identifier of the internet of things device.

In a possible design, the information about the second application includes an application name of the second application and a download address of the second application.

A fourth aspect of this application provides a network configuration method, applied to a first server. The network configuration method includes: The first server receives an information obtaining request, sent by a first service of a mobile device, for a second application. The information obtaining request includes label information of an internet of things device. The second application is used to configure a network for the internet of things device. The first server determines information about the second application based on the label information. The first server sends the information about the second application to a first application.

In a possible design, that the first server determines information about the second application based on the label information includes: The first server determines an identifier of a label based on an identifier of the internet of things device in the label information. The first server determines the information about the second application based on the identifier of the label.

In a possible design, the information obtaining request further includes a package name of the first application.

Before the first server determines the information about the second application based on the label information, the first server may determine, based on the package name of the first application, whether the first application has permission to trigger the second application. If yes, the first server determines the information about the second application based on the label information.

In a possible design, after the first server determines, based on the package name of the first application, whether the first application has the permission to trigger the second application, if no, the first server sends an error prompt to the first application. The error prompt indicates that the first application has no permission to trigger the second application.

A fifth aspect of this application provides a network configuration method, applied to a second server and including: The second server receives a download request sent by a second service of a mobile device. The download request is used to request to download a second application. The download request includes information about the second application. The second application is used to configure a network for an internet of things device. The second server determines an application package of the second application based on the information about the second application. The second server sends the application package of the second application to the second service.

A sixth aspect of this application provides a network configuration system, including a mobile device, a first server, a second server, and an internet of things device. The mobile device approaches the internet of things device, and obtains label information of the internet of things device. The mobile device sends an information obtaining request for a second application to the first server. The information obtaining request includes the label information of the internet of things device. The second application is used to configure a network for the internet of things device. The first server determines information about the second application based on the label information of the internet of things device. The first server sends the information about the second application to the mobile device. The mobile device discovers the internet of things device. The mobile device sends an information obtaining request to the internet of things device. The internet of things device sends information about the internet of things device. The mobile device sends a download request to the second server. The download request is used to request to download the second application. The download request includes the information about the second application. The second server determines an application package of the second application based on the information about the second application. The second server sends the application package of the second application to the mobile device. The mobile device starts the second application.

In a possible design, the mobile device performs the method according to the first aspect or the third aspect. The first server performs the method according to the second aspect or the fourth aspect. The second server performs the method according to the fifth aspect.

A seventh aspect of this application provides a network configuration device, including a memory, a processor, and a transceiver.

The processor is configured to be coupled to the memory, and read and execute instructions in the memory to perform the method according to any one of the first to fifth aspects.

The transceiver is coupled to the processor. The processor controls the transceiver to perform message receiving and sending.

An eighth aspect of this application provides a computer-readable storage medium. The computer storage medium stores computer instructions. When the computer instructions are executed by a computer, the computer is enabled to perform the method according to any one of the first to fifth aspects.

The network configuration method and device provided in embodiments of this application are applied to a mobile device. The mobile device includes a first application, a first service, and a second service. The method includes: The first application obtains label information of an internet of things device to be network-configured. The first application obtains information about a second application. The second application is used to configure a network for the internet of things device. The first application sends a first message to the first service. The first message indicates to start the first service. The first message includes the information about the second application. The first service discovers the internet of things device to be network-configured. The first service sends a second message to the second service. The second message indicates to start the second application. The second message includes the information about the second application. The second service starts the second application based on the second message. Compared with the conventional technology, in the device network configuration method provided in this application, a user can download and install a network configuration application as required, and an integrated operation for device network configuration is implemented, thereby reducing network configuration operation steps and network configuration time, implementing integration of network configuration application download and network configuration, and further improving user experience.

BRIEF DESCRIPTION OF DRAWINGS

FIG. 9A to FIG. 9D are a signaling interaction diagram of a network configuration method according to an embodiment of this application;

FIG. 14A to FIG. 14C are a schematic signaling diagram of yet another network configuration method according to an embodiment of this application;

DESCRIPTION OF EMBODIMENTS

Figure 1:
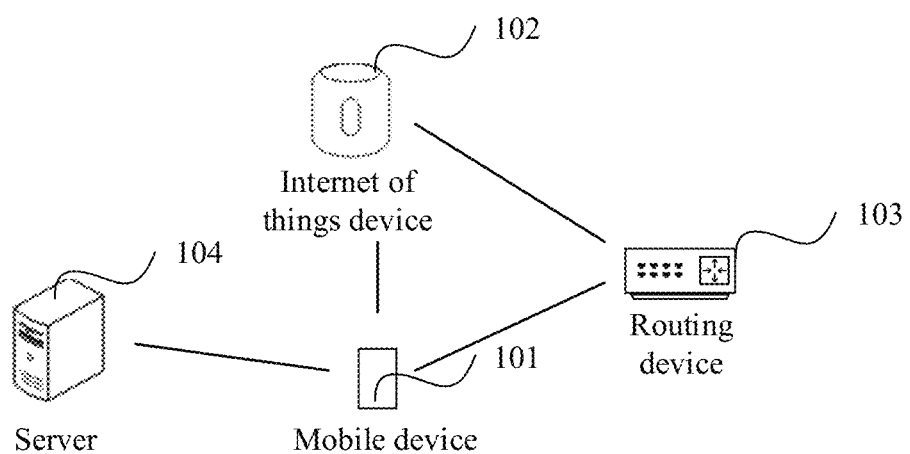
FIG. 1 is a schematic diagram of an architecture of a communication system according to an embodiment of this application.

The following clearly describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

It should be noted that "and/or" in embodiments of this application describes only an association relationship for describing associated objects and represents that three relationships may exist. For example, A and/or B represents the following three cases: Only A exists, both A and B exist, and only B exists.

In the specification and claims of embodiments of this application, "first", "second", and the like are used to distinguish between different objects, but are not used to describe a specific order of the objects and limit a specific quantity. For example, a first target object, a second target object, and the like are used to distinguish between different target objects, but are not used to describe a specific order of the target objects and limit a specific quantity of target objects.

In embodiments of this application, "example" or "for example" is used to represent giving an example, an illustration, or a description. Any embodiment or design scheme described as an "example" or "for example" in embodiments of this application should not be explained as having more advantages than another embodiment or design scheme. Exactly, use of the word "example", "for example", or the like is intended to present a related concept in a specific manner.

In the description of embodiments of this application, unless otherwise stated, "multiple" means two or more than two.

The following explains and describes some terms in this application to facilitate understanding by a person skilled in the art.

An atomic ability (AA) is developed by a developer, is a program entity that implements a single function, and has no user interface (UI). In addition, there is a dependency relationship between the AA and a system service, and there is no dependency relationship between AAs. The system service may include but is not limited to a clock service (RTC), a connection manager (Wi-Fi and a GSM modem), positioning (e.g., Global Positioning System (GPS)), a power supply (e.g., power management integrated circuit (PMIC)), a sensor, and communication (a GSM modem, Wi-Fi, and Bluetooth).

A feature ability (FA) is a single-user feature functional program entity implemented by invoking the AA. The FA has a user interface (UI), and is able to implement FA functions by interacting with a user.

With development of internet of things technologies, various internet of things devices emerge. For example, a smart home environment usually includes internet of things devices such as an audio/video device, a lighting system, an air conditioner control device, and an internet appliance. A Wi-Fi module is usually configured in an internet of things device, and is able to access a Wi-Fi network. Before using an internet of things device, a user usually needs to perform visualized network configuration on the internet of things device by using a terminal device such as a mobile phone, to enable the internet of things device to access a Wi-Fi network to facilitate subsequent control and operations on the internet of things device.

The following uses an architecture shown in FIG. 1 as an example to describe a network configuration process of an internet of things device. FIG. 1 is a schematic diagram of an architecture of a communication system according to an embodiment of this application. The communication system shown in FIG. 1 may include a mobile device 101, an internet of things device 102, and a routing device 103. The mobile device 101 may send a service set identifier (SSID) and a password of a to-be-configured Wi-Fi network to the internet of things device 102. Then, the internet of things device 102 accesses the routing device 103 based on the received SSID and password of the to-be-configured Wi-Fi network.

Still refer to FIG. 1. In some embodiments, the communication system may further include a server 104. The mobile device 101 sends a request to the server 104 to obtain a network configuration application corresponding to the internet of things device 102. After receiving the request from the mobile device 101, the server 104 may send, to the mobile device 101, an application package of the network configuration application corresponding to the internet of things device 102. After receiving the application package of the network configuration application corresponding to the internet of things device 102, the mobile device 101 may install the network configuration application corresponding to the internet of things device 102, to perform network configuration on the internet of things device 102.

It may be understood that how the mobile device 101 obtains the network configuration application corresponding to the internet of things device 102 is not limited in embodiments of this application. In an optional implementation, the mobile device 101 may obtain the network configuration application corresponding to the internet of things device 102 by scanning a two-dimensional code on a body of the internet of things device 102. In another optional implementation, the mobile device 101 may obtain the network configuration application corresponding to the internet of things device 102 by touching the internet of things device 102 to perform NFC.

The mobile device 101 in this application may include but is not limited to a mobile phone, a tablet computer, an e-reader, a remote control, a personal computer (PC), a notebook computer, a personal digital assistant (PDA), a vehicle-mounted device, a wearable device, a smartwatch, a smart band, and the like.

Figure 2:
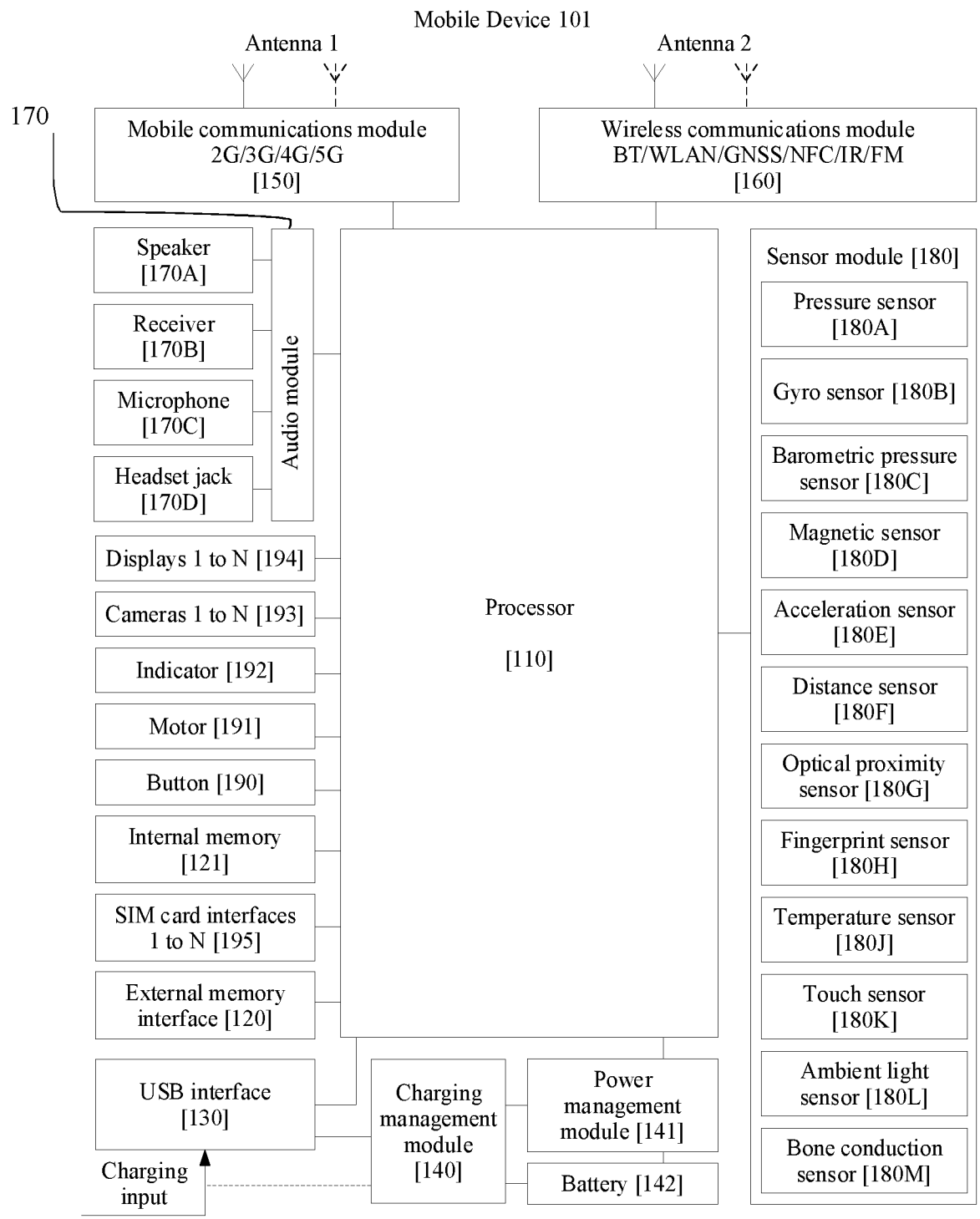
FIG. 2 is a schematic diagram of a structure of a mobile device according to an embodiment of this application.

With reference to FIG. 2, the following uses a mobile phone as an example to specifically describe the mobile device 101 in this application.

FIG. 2 is a schematic diagram of a structure of a mobile device according to an embodiment of this application. As shown in FIG. 2, the mobile device 101 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU).

The controller may be a nerve center and a command module of the mobile device 101. The controller may generate an operation control signal based on an instruction operation code and a time sequence signal to control instruction fetching and instruction executing.

A memory may be further disposed in the processor 110, and is configured to store instructions and data.

The charging management module 140 is configured to receive a charging input from the charger.

The power management module 141 is configured to connect the battery 142, the charging management module 140, and the processor 110.

A wireless communication function of the mobile device 101 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile device 101 may be configured to cover one or more communication frequency bands. Different antennas may be further multiplexed to improve antenna utilization.

The mobile communication module 150 may provide a solution applied to the mobile device 101 for wireless communication such as 2G/3G/4G/5G.

The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The mobile device 101 implements a display function by using the GPU, the display 194, the AP, and the like. The GPU is a microprocessor for image processing, and is connected to the display 194 and the AP. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel.

The mobile device 101 may implement a photographing function through the ISP, the camera 193, the video codec, the GPU, the display 194, the AP, and the like.

The ISP is configured to process data fed back by the camera 193. The camera 193 is configured to capture a static image or a video.

The external memory interface 120 may be used to connect an external storage card, for example, a micro SD card, to extend a storage capability of the mobile device 101. The external memory card communicates with the processor 110 through the external memory interface 120 to implement a data storage function. For example, files such as music and videos are stored in the external storage card.

The internal memory 121 may be configured to store computer-executable program code, and the executable program code includes instructions. The processor 110 runs the instructions stored in the internal memory 121, thereby executing various functional applications and data processing of the mobile device 101. The internal memory 121 may include a program storage area and a data storage area.

The mobile device 101 may implement audio functions, for example, music playback and recording, by using the audio module 170, the speaker 170A, the receiver 170B, the microphone 170C, the headset jack 170D, the AP, and the like.

The audio module 170 is configured to convert digital audio information into an analog audio signal for output, and is also configured to convert analog audio input into a digital audio signal. The audio module 170 may be further configured to code and decode an audio signal.

The speaker 170A, also referred to as a "loudspeaker", is configured to convert an audio electrical signal into a sound signal. The receiver 170B, also referred to as an "earpiece", is configured to convert an electrical audio signal into a sound signal. The microphone 170C, also referred to as a "mike" or a "mic", is configured to convert a sound signal into an electrical signal. The headset jack 170D is configured to connect a wired headset.

The pressure sensor 180A is configured to sense a pressure signal, and can convert the pressure signal into an electrical signal. The gyroscope sensor 180B may be configured to determine a motion posture of the mobile device 101. The barometric pressure sensor 180C is configured to measure barometric pressure. The magnetic sensor 180D includes a Hall sensor. The mobile device 101 may detect opening and closing of a flip cover by using the magnetic sensor 180D. The acceleration sensor 180E may detect values of accelerations of the mobile device 101 in various directions (usually on three axes). The distance sensor 180F is configured to measure a distance. The optical proximity sensor 180G may include, for example, a light-emitting diode (LED), and an optical detector, for example, a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The bone conduction sensor 180M may obtain a vibration signal.

The button 190 includes a power button, a volume button, and the like. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect a SIM card.

It may be understood that the structure shown in this application does not constitute a specific limitation on the mobile device 101. In some other embodiments, the mobile device 101 may include more or fewer components than those shown in the figure, or some components may be combined, or some components may be split, or different component arrangements may be used. The components shown in the figure may be implemented by hardware, software, or a combination of software and hardware.

The following describes a software system of the mobile device 101. The software system of the mobile device 101 may use a layered architecture, an event-driven architecture, a microkernel architecture, a micro service architecture, or a cloud architecture. In this application, an Android system of the layered architecture is used as an example to describe a software structure of the mobile device 101. A type of an operating system of the electronic device is not limited in this application, for example, an Android system or a Harmony Operating System (OS).

Figure 3:
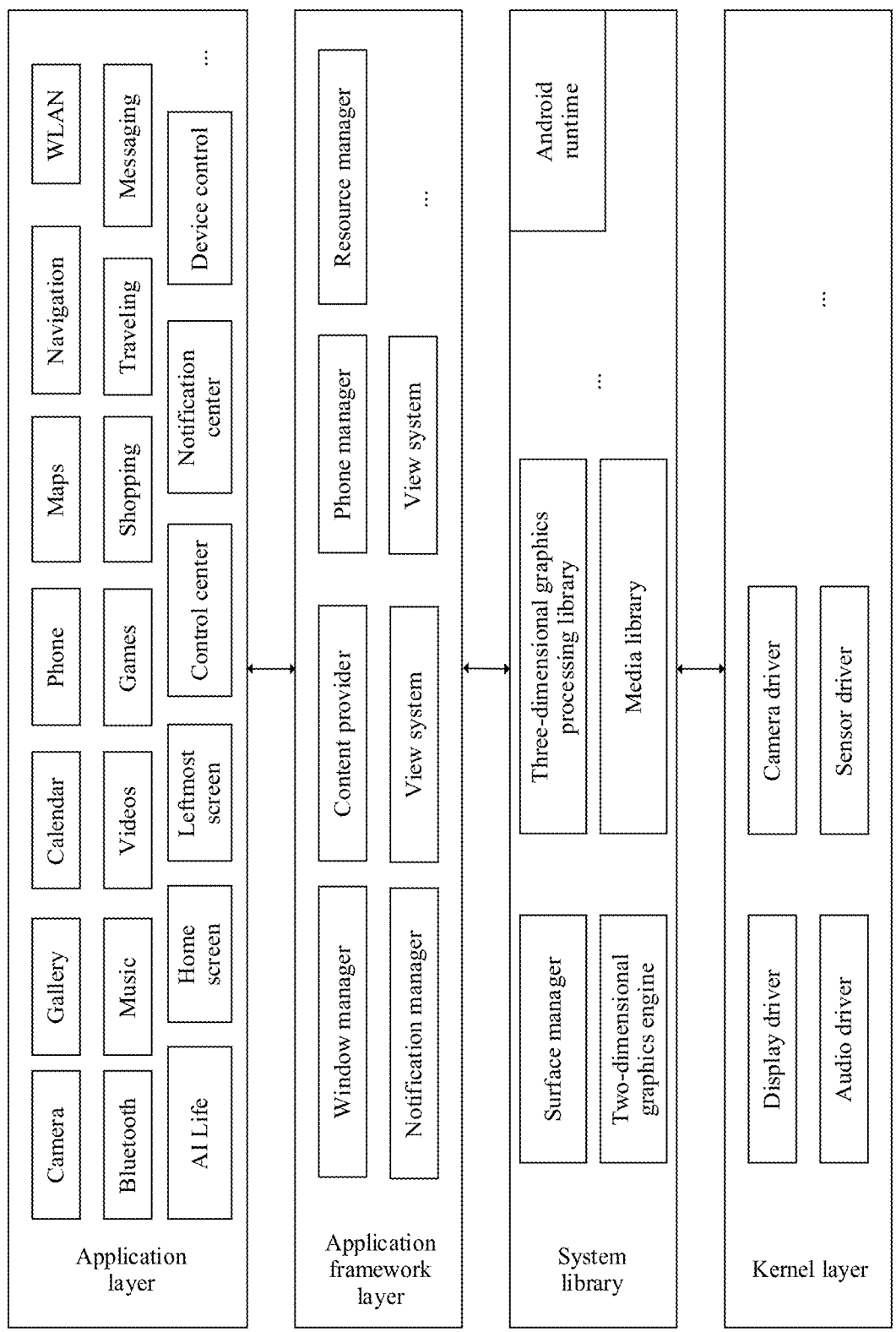
FIG. 3 is a block diagram of a software structure of an electronic device according to an embodiment of this application.

FIG. 3 is a block diagram of a software structure of an electronic device according to an embodiment of this application. As shown in FIG. 3, a layered architecture divides software into several layers, each with a clear role and division of labor. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Videos, Games, Shopping, Traveling, Instant messaging, AI Life, and Device Control.

The application AI Life may be used to control or manage a home device with a networking function. For example, the home device may include an electric light, a television, and an air conditioner. For another example, the home device may further include an anti-theft door lock, a sound box, a floor sweeping robot, a socket, a body fat scale, a desk lamp, an air purifier, a refrigerator, a washing machine, a water heater, a microwave oven, an electric cooker, a curtain, a fan, a television, a set-top box, a door, and a window.

In addition, the application packages may further include applications such as a home screen (namely, a desktop), a leftmost screen, a control center, a notification center, a card application, and a card service application.

The leftmost screen may also be referred to as a "−1 screen", and refers to a user interface (UI) obtained by sliding a screen rightward on the home screen of the electronic device until sliding to the leftmost split screen. For example, the leftmost screen may be used to place some quick service functions and notification messages, such as global search, a quick entry (a payment code, WeChat, and the like) of a page of an application, instant information, and reminders (express information, expenditure information, commuting road conditions, taxi hailing information, schedule information, and the like), and followed dynamic information (such as a football platform, a basketball platform, and stock information). The control center is a drop-down message notification bar of the electronic device, namely, a user interface displayed by the electronic device when a user performs a downward operation on the electronic device. The notification center is a pull-up message notification bar of the electronic device, namely, a user interface displayed by the electronic device when the user performs an upward operation on the electronic device. For the card service application, refer to content mentioned below. Details are not described herein again. The card service application is used to provide a card service, so as to support UI display of a card, sharing of the card between applications on a same device, sharing of the card between devices, and the like.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying an image. The view system may be configured to construct an application. A display interface may include one or more views. For example, a display interface including a Messaging icon may include a text display view and an image display view.

The phone manager is configured to provide a communication function of the mobile device 101, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The routing device 103 in this application may include but is not limited to a router, a customer mobile device (e.g., customer premise equipment (CPE)), and the like.

Figure 4:
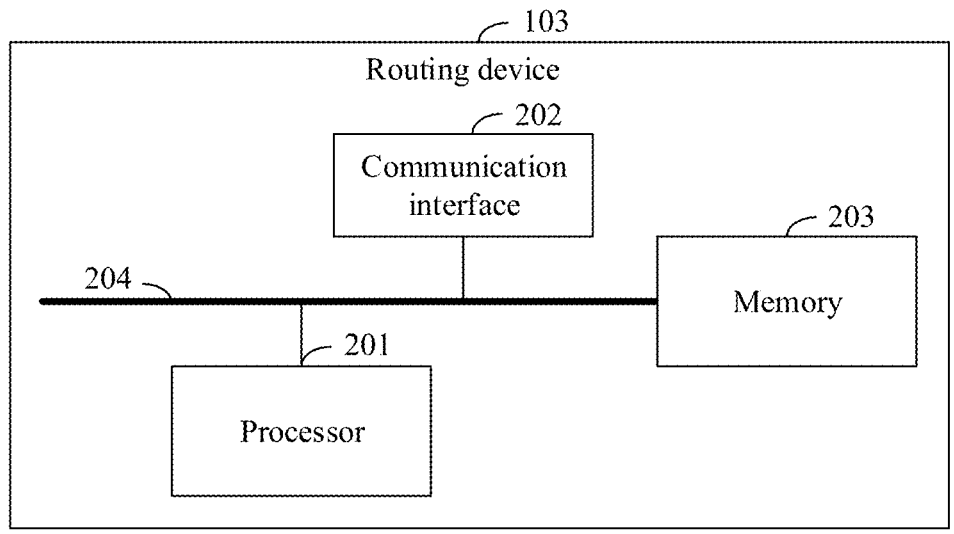
FIG. 4 is a schematic diagram of a structure of a routing device according to an embodiment of this application.

FIG. 4 is a schematic diagram of a structure of a routing device according to an embodiment of this application. With reference to FIG. 4, a structure of the routing device 103 in this application is further described. As shown in FIG. 4, the routing device 103 includes one or more processors 201, a plurality of communication interfaces 202, and a memory 203. The processor 201, the communication interface 202, and the memory 203 may be connected by using a bus or in another manner. In embodiments of this application, connection by using a bus 204 is used as an example.

The processor 201 may include one or more general-purpose processors, for example, CPUs. The processor 201 may be configured to run related program code for staggering startup of a smart home device.

The communication interface 202 may be a wired interface (for example, an Ethernet interface) or a wireless interface (for example, a cellular network interface or a wireless local area network interface), and is configured to communicate with another node. In this application, the communication interface 202 may be specifically configured to communicate with a mobile device 101, and is further configured to communicate with a server 104.

The memory 203 may include a volatile memory, for example, a RAM. The memory may further include a non-volatile memory, for example, a ROM, a flash memory, an HDD, or a solid-state drive (SSD). Alternatively, the memory 203 may include a combination of the foregoing types of memories. The memory 203 may be configured to store a group of program code, so that the processor 201 invokes the program code stored in the memory 203 to enable the routing device 103 to implement a communication method in this application.

It should be noted that the routing device 103 shown in FIG. 4 is merely an implementation of this application. In actual application, the routing device 103 may further include more or fewer components. This is not limited herein.

In this application, a schematic diagram of a structure of the routing device 103 is similar to the routing device 103 shown in FIG. 4. Details are not described herein again. In addition, in actual application, the routing device 103 may further include more or fewer components. This is not limited herein.

It should be noted that the routing device 103 may be connected to one mobile device, or may be connected to multiple mobile devices at the same time. For a specific connection manner between each mobile device and the routing device 103, reference may be made to the foregoing description, and details are not described herein again. The mobile device may be connected to one routing device, or may be connected to multiple routing devices. For a specific connection manner between the mobile device and each routing device, reference may be made to the foregoing description, and details are not described herein again.

A quantity of mobile devices connected to the routing device 103 may be set according to performance indicators of a central processing unit (CPU), a memory, and the like of the routing device 103. This is not limited in this application.

The internet of things (JOT) device 102 in this application may include but is not limited to a sound box, a television, a smart screen, a high-definition television, a 4K television, a projector, a floor sweeping robot, a socket, a body fat scale, a desk lamp, an air purifier, a refrigerator, a washing machine, a water heater, a microwave oven, an electric cooker, a curtain, a fan, a set-top box, a door, a window, and the like.

Figure 5:
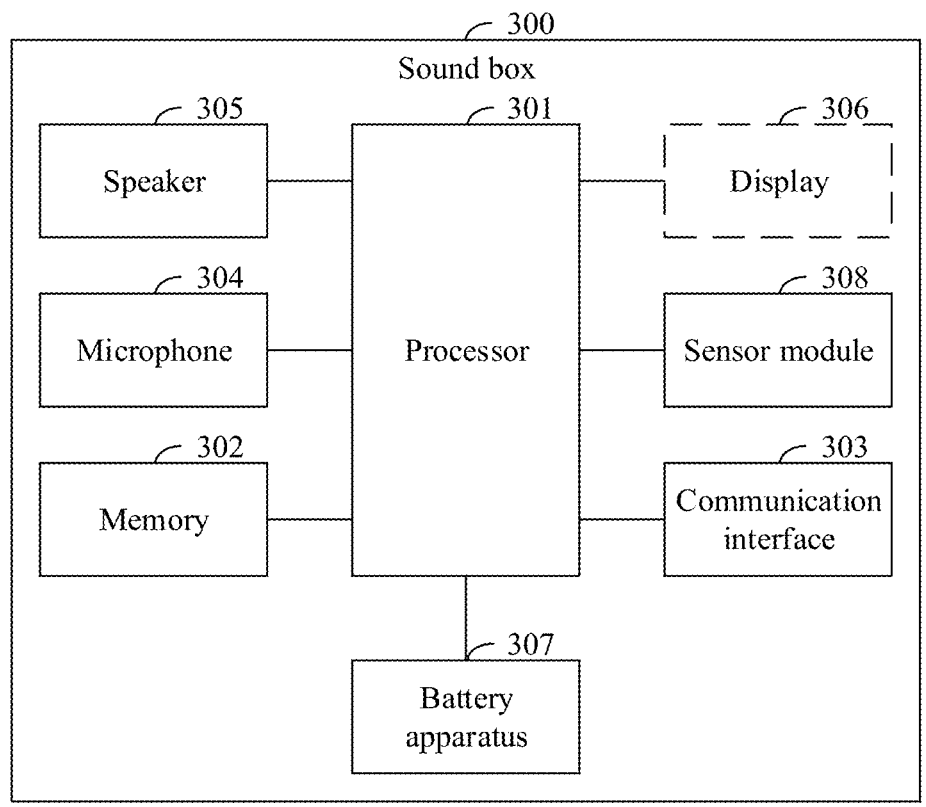
FIG. 5 is a functional block diagram of a sound box according to an embodiment of this application.

With reference to FIG. 5, the following uses a sound box 300 as an example to specifically describe the internet of things device in this application.

FIG. 5 is a functional block diagram of a sound box according to an embodiment of this application. In some embodiments, as shown in FIG. 5, the sound box 300 may include a processor 301, a memory 302, a communication interface 303, a microphone 304, a speaker 305, and the like. These components may perform communication through one or more communication buses or signal cables (not shown in the figure).

The following specifically describes the components of the sound box 300 with reference to FIG. 5.

The processor 301 is a control center of the sound box 300, is connected to various components of the sound box 300 through various interfaces and lines, and performs various functions of the sound box 300 and data processing by running or executing an application stored in the memory 302 and invoking data stored in the memory 302.

In some embodiments, the processor 301 may include one or more processing units. For example, the processor 301 may include an AP, a modem processor, a GPU, an ISP, a controller, a memory, a video codec, a DSP, a baseband processor, and/or an NPU. Different processing units may be independent components, or may be integrated into one or more processors. The controller may be a nerve center and a command center of the sound box 300. The controller may generate an operation control signal based on an instruction operation code and a time sequence signal to control instruction fetching and instruction executing. In some other embodiments, a memory may further be disposed in the processor 301, to store instructions and data. In some embodiments, the memory in the processor 301 is a cache. The memory may store instructions or data just used or cyclically used by the processor 301. If the processor 301 needs to use the instructions or the data again, the processor 301 may directly invoke the instructions or the data from the memory. This avoids repeated access and reduces waiting time of the processor 301, thereby improving system efficiency. The processor 301 may run software code or a module of a device control method provided in some embodiments of this application, to implement a function of controlling the sound box 300.

The memory 302 is configured to store the application and the data. The processor 301 performs various functions of the sound box 300 and data processing by running the application and the data that are stored in the memory 302. The memory 302 mainly includes a program storage area and a data storage area. The program storage area may store an OS, and an application required by at least one function (for example, a sound playing function or a voice collecting function). The data storage area may store data (for example, audio data) created based on use of the sound box. In addition, the memory 302 may include a high-speed random access memory (RAM), and may further include a non-volatile memory such as a magnetic disk storage device or a flash memory, another volatile solid-state storage device, or the like. In some embodiments, the memory 302 may store information such as a "wakeup word". In some other embodiments, the memory 302 may further store audio information (for example, a song, crosstalk, or storytelling). In addition, the memory 302 may store various operating systems. The memory 302 may be independent, and is connected to the processor 301 through the communication bus. Alternatively, the memory 302 may be integrated with the processor 301.

The communication interface 303 may be a wired interface (for example, an Ethernet interface) or a wireless interface (for example, a cellular network interface or a wireless local area network interface). For example, the communication interface 303 may be specifically configured to communicate with another device such as a mobile phone or a television, and is further configured to communicate with a server.

In some embodiments, the communication interface 303 may further provide an audio circuit between a user and the sound box. In one aspect, the audio circuit may transmit an audio electrical signal converted from a received audio signal to the speaker 305, and the speaker 305 converts the audio electrical signal into a sound signal for output. In another aspect, the microphone 304 converts a collected sound signal (for example, a voice sent by the user) into an electrical signal, and the audio circuit receives the electrical signal, converts the electrical signal into audio data (or voice data), and then outputs the audio data.

The microphone 304, also referred to as a "mike" or a "mic", is configured to collect a sound signal (for example, collect a sound made by the user), and convert the sound signal into an electrical signal. In some embodiments, one or more microphones 304, for example, a microphone array, may be disposed on the sound box 300. In some other embodiments, in addition to collecting the sound signal, the microphone 304 may implement a noise reduction function for the sound signal, or may identify a source of the sound signal, implement a directional recording function, and the like.

The speaker 305, also referred to as a "loudspeaker", is configured to convert an audio electrical signal into a sound signal. The sound box 300 may play a sound signal such as music by using the speaker 305.

In some embodiments, the microphone 304 and the speaker 305 are coupled to the processor 301. For example, after receiving a sound signal, the microphone 304 sends the sound signal or an audio electrical signal converted from the sound signal to the processor 301. The processor 301 determines whether to make a response to the sound signal or the audio electrical signal. If determining to make the response, the processor 301 outputs a corresponding output signal, for example, plays music through the speaker 305.

In addition, the sound box 300 may include a display 306 (or a display screen), or may not include a display 306. The display 306 may be configured to display a display interface of an application, for example, a currently played song. The display 306 includes a display panel. The display panel may be a liquid-crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light emitting diode (QLED), or the like. In some embodiments, a touch sensor may be disposed on the display 306 to form a touchscreen. This is not limited in this application. The touch sensor is configured to detect a touch operation performed on or near the touch sensor. The touch sensor may transfer the detected touch operation to the processor 301 to determine a type of the touch event. The processor 301 may provide a visual output related to the touch operation through the display 306.

In addition, the sound box 300 may further include a power supply apparatus 307 (for example, a battery and a power management chip) that supplies power to the components. The battery may be logically connected to the processor 301 by using the power management chip, so that functions such as charging management, discharging management, and power consumption management are implemented by using the power supply apparatus 307.

In addition, the sound box 300 may further include a sensor module 308. The sensor module 308 may include a barometric pressure sensor, a temperature sensor, and the like. In actual application, the sound box 300 may alternatively include more or fewer sensors, or the foregoing enumerated sensors may be replaced with other sensors having same or similar functions, or the like. This is not limited in this application.

It may be understood that the device structure shown in FIG. 5 does not constitute a specific limitation on the sound box. In some other embodiments, the sound box may include more or fewer components than those shown in the figure, or some components may be combined, or some components may be split, or different component arrangements may be used. The components shown in the figure may be implemented by hardware, software, or a combination of software and hardware.

Based on the communication system shown in FIG. 1, the following provides specific implementation of two related network configuration processes of the internet of things device.

A first network configuration process of the internet of things device is mainly implemented through NFC. The mobile device first performs NFC with the internet of things device by touching the internet of things device, so as to obtain a download address of a network configuration application provided by the internet of things device. Then, the mobile device downloads and installs the network configuration application based on the download address of the network configuration application. Next, the user starts the network configuration application installed on the mobile device, and uses the mobile device to touch the internet of things device again, so that the mobile device discovers the internet of things device, and establishes a connection to the internet of things device. Finally, the mobile device may send an SSID and a password, which are entered by the user, of a network, to the IoT device through the network configuration application, so as to complete network configuration for the IoT device.

In a second network configuration process of the internet of things device, the user first starts an application with a code scanning function in the mobile device, and scans a two-dimensional code on the internet of things device by using the scanning function. Then, the mobile device downloads and installs a network configuration application based on a download address, obtained from the two-dimensional code, of the network configuration application. Next, the user starts the network configuration application, and taps a network configuration button in the network configuration application, so that the mobile device enters a network configuration mode to discover the internet of things device around the mobile device. Finally, after the internet of things device is discovered, the network configuration application jumps to a network configuration interface to receive an SSID and a password, which are entered by the user, of a network, and sends the SSID and the password of the network to the internet of things device, so as to complete network configuration of the internet of things device. It should be noted that, in the network configuration mode, the mobile device may actively scan and discover the internet of things device to be network-configured, and establish the connection to the internet of things device.

In the first network configuration process of the internet of things device, before the user enters the SSID and the password of the to-be-configured network into the network configuration application, the user needs to first use the mobile device to touch the internet of things device once, then manually starts the network configuration application, and uses the mobile device to touch the internet of things device for a second time. In the second network configuration process of the internet of things device, before the user enters the SSID and the password of the to-be-configured network into the network configuration application, the user needs to manually start the application with the code scanning function to scan the two-dimensional code on the internet of things device, and after the network configuration application is downloaded and installed, manually starts the network configuration application, and taps the network configuration button to enable the mobile device to enter the network configuration mode. Therefore, in the two related solutions, the network configuration process is complex, and a network configuration speed is slow. In addition, before the user enters the S SID and the password of the to-be-configured network into the network configuration application, the user needs to manually operate the application on the mobile device, so that the network configuration process is complex.

To resolve the foregoing problem, this application provides a technical solution: After obtaining label information of the internet of things device, the mobile device may first determine information about the network configuration application based on the label information. Then, a first service of the mobile device discovers the internet of things device to be network-configured. Then, a second service of the mobile device starts the network configuration application based on the information about the network configuration application. Compared with the conventional technology, in a device network configuration method provided in this application, a user can download and install a network configuration application as required, and an integrated operation for device network configuration is implemented, thereby reducing network configuration operation steps and network configuration time, implementing integration of network configuration application download and network configuration, and further improving user experience. In addition, in embodiments of this application, a network configuration service is used to discover an internet of things device, so that a network configuration process can be greatly reduced, and a network configuration speed is increased.

Based on the foregoing description, the following describes a network configuration method provided in embodiments of this application with reference to specific embodiments. The following several embodiments may be combined with each other, and a same or similar concept or process may not be described repeatedly in some embodiments.

Figure 6:
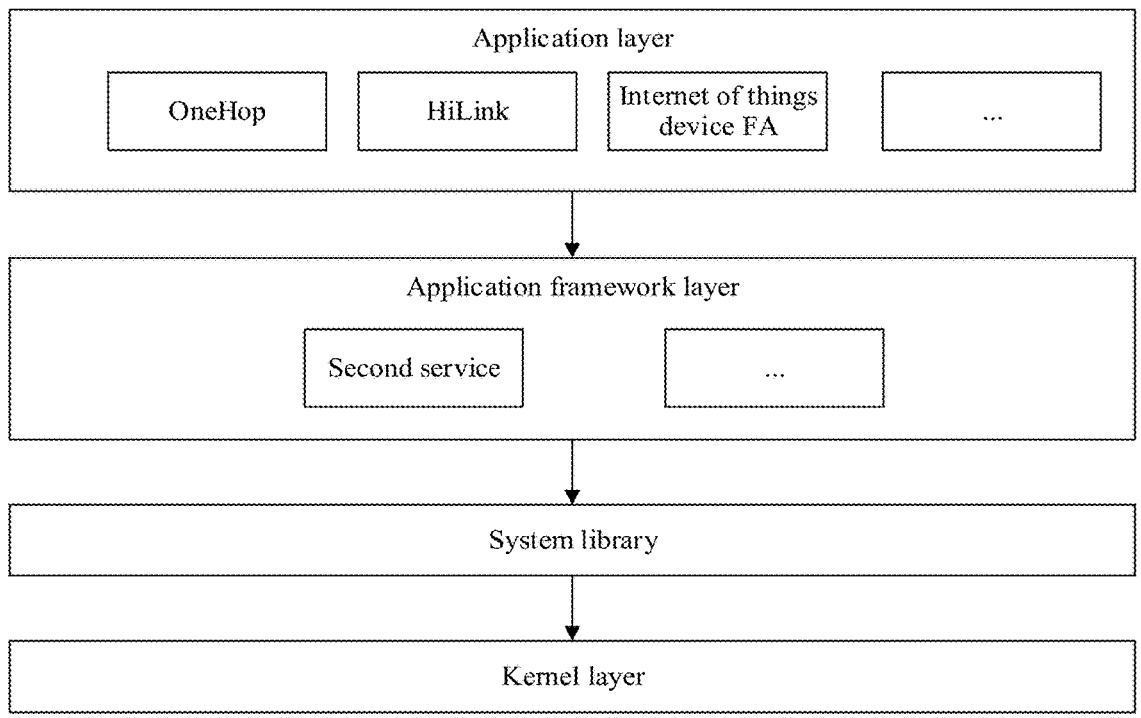
FIG. 6 is a block diagram of a software structure of an electronic device according to an embodiment of this application.

FIG. 6 is a block diagram of a software structure of an electronic device according to an embodiment of this application. A software architecture of a mobile device shown in FIG. 6 may include an application layer, an application framework layer, a system layer, and a kernel layer. The application layer may include a first application, a second application, and a first service. The application framework layer may include a second service. The first service and the second service are software entities with specific functions.

Figure 7:
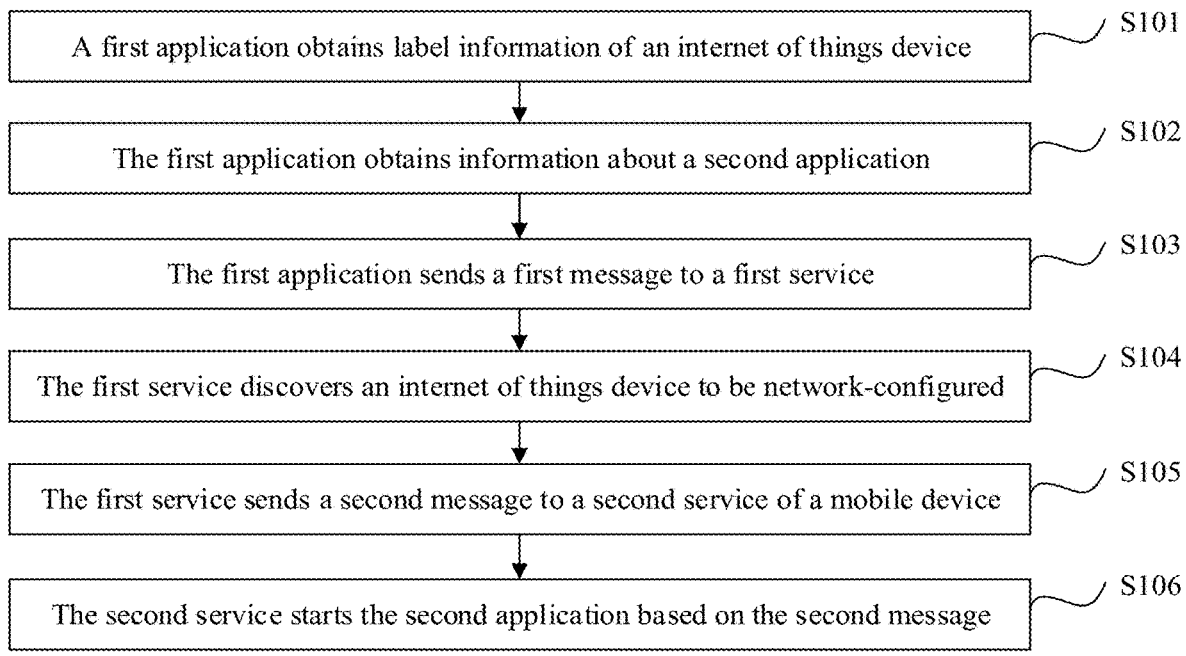
FIG. 7 is a schematic flowchart of a network configuration method according to an embodiment of this application.

The first application is an NFC label reading application, and may be, for example, a OneHop application. The second application is an internet of things-based network configuration application, and may be, for example, an internet of things device FA. The first service is a network configuration service or a network configuration module, for example, Hilink. The second service is used for application query, application download, application installation, and application startup. FIG. 7 is a schematic flowchart of a network configuration method according to an embodiment of this application. With reference to FIG. 6 and FIG. 7, the network configuration method is applied to a mobile device. The mobile device includes a first application, a first service, and a second service. This embodiment describes a specific implementation process of how the mobile device quickly configures a network for an internet of things device. As shown in FIG. 7, the network configuration method in this application may include the following steps.

S101: The first application obtains label information of the internet of things device.

The label information may include an identifier (Product Id) of the internet of things device. The identifier of the internet of things device may include related information of the internet of things device. The related information of the internet of things device may be, for example, a device vendor, a device category, a device model, and a device name. In some embodiments, the device vendor may register the internet of things device with an internet of things device platform, and the internet of things device platform generates, based on information such as the device vendor, the device category, the device model, and the device name, the product ID corresponding to the internet of things device.

In some other embodiments, the label information may further include a random number. The random number is used to perform anti-tamper verification on the label information and perform uniqueness verification on the internet of things device.

Figure 8A:
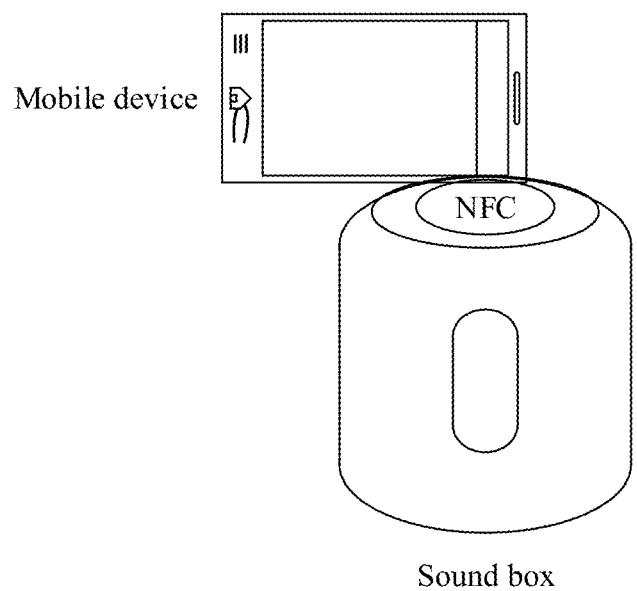
FIG. 8A is a schematic diagram of a scenario according to an embodiment of this application.

For example, FIG. 8A is a schematic diagram of a scenario according to an embodiment of this application. As shown in FIG. 8A, when a user wants to perform network configuration for a sound box, the user may enable an NFC function of the mobile device, and use the mobile device to touch the sound box. In this case, the first application runs in a background of the mobile device, so as to perform NFC with the sound box by using the first application, and read label information of the sound box.

It should be understood that, to implement NFC between the mobile device and the internet of things device, both the mobile device and the internet of things device need to integrate an NFC communication module. Still refer to FIG. 8A. The NFC communication module on the internet of things device is usually integrated at a specific location of the internet of things device, for example, a top of the sound box shown in FIG. 8A. Therefore, before the mobile device is used to attempt to read the label information of the internet of things device, the location of the NFC communication module of the internet of things device needs to be first determined, and then the mobile device is used to touch the location, indicated on the sound box, of the NFC communication module. In this way, the mobile device successfully performs NFC with the sound box.

In some embodiments, after obtaining the label information of the internet of things device, the first application may further check whether there is information about a second application in a local cache. If there is the information about the second application, the first application may further send the information about the second application to the first service of the mobile device through a first message. The first message indicates to start the first service.

It should be understood that a type of the second application is not limited in embodiments of this application. For example, the second application may be a network configuration application, a quick application, or an applet, or may be an internet of things device FA. The FA is a single-user feature functional program entity implemented by invoking an AA. The FA has a UI, and is able to implement FA functions by interacting with the user.

It should be noted that, compared with a conventional application, in this embodiment of this application, one application may include a plurality of FAs. For example, a music application may include a lyric FA and a dub FA, and the mobile device may download only one FA in one application, for example, download only the dub FA.

In some embodiments, after the internet of things device FA completes running, an operating system of the mobile device may manage, control, and kill the internet of things device FA based on an impact factor such as a memory resource, so that the internet of things device FA and a related resource, downloaded from an FA market, of the internet of things device FA may be released. Therefore, compared with downloading and installing an APP corresponding to the internet of things device in a related technology, the internet of things device FA helps reduce a memory overhead of the mobile device.

In some embodiments, the internet of things device FA may not only perform network configuration on the internet of things device, but also control another function of the internet of things device. For example, a sound box FA is used as an example. The sound box FA may further implement functions such as adjusting a playback volume of the sound box and controlling the sound box to play a song.

It should be understood that the information about the second application in this application may include an application name of the second application and a uniform resource locator (URL) download address of the second application. The application name of the second application and the URL download address of the second application may be used to obtain an application package of the second application. In addition, in some embodiments, the information about the second application may further include a version number of the second application.

It should be understood that the first service in this embodiment of this application may also be referred to as a network configuration module. For example, the first service may be a HiLink service. The first service has no UI, and is used to discover a device to be network-configured. In addition, in some embodiments, the first service may be further configured to obtain device information from the internet of things device and display a device discovery animation on the mobile device.

S102: The first application obtains the information about the second application.

In some embodiments, after reading the label information of the internet of things device, the first application may send the label information of the internet of things device to a first server. The first server may be, for example, a server of a service management system (HAG). After receiving the label information of the internet of things device, the first server may query an identifier of a label based on the identifier of the internet of things device in the label information of the internet of things device. Then, the first server determines the information about the second application based on the identifier of the label, and sends the information about the second application to the first application.

It should be noted that the first server stores a mapping relationship between an identifier of an internet of things device and information about a second application, or stores a mapping relationship between an identifier of an internet of things device and an identifier of a label and a mapping relationship between an identifier of a label and information about a second application. After receiving the label information of the internet of things device, because the label information includes the identifier of the internet of things device, the first server first queries, based on the mapping relationship between an identifier of an internet of things device and an identifier of a label, the identifier of the label corresponding to the identifier of the internet of things device. Then, the first server determines the information about the second application based on the mapping relationship between an identifier of a label and information about a second application.

It should be understood that the first server is configured to manage download and startup of an application.

In some embodiments, the device vendor registers the internet of things device with a device platform by uploading device vendor information, the device category, the device model, and the device name. The device platform generates the product ID corresponding to the internet of things device. Then, the device vendor logs in to a label operation management platform, enters the product ID, and applies for the label of the internet of things device. The label operation management platform synchronizes a mapping relationship between the product ID and the identifier of the label to the first server. Next, the device vendor develops, on a second server, the second application corresponding to the internet of things device. The second server also synchronizes the information about the second application to the first server. Finally, the device vendor logs in to the first server, and associates the second application with the identifier of the label. The second server is an application market server.

It should be understood that the mapping relationship between an identifier of a label and information about a second application may be correspondingly changed with a service change of the internet of things device. For example, after a version of the second application is updated, the version number of the second application, which has a mapping relationship with the identifier of the label, in the first server also changes.

It should be noted that, in some embodiments, the first application may send the label information to the first server, and after determining the information about the second application, the first server may also send the information about the second application to the first application.

In some embodiments, when sending the label information to the first server, the first application further sends a package name of the first application to the first server at the same time. Because a manner in which the second application may be triggered is preset in the first server, after receiving the label information and the package name of the first application, the first server may first verify, based on the package name of the first application, whether the first application has permission to trigger the second application. If no, an error prompt is sent to the first application. If yes, the information about the second application continues to be determined based on the label information, and then the information about the second application is sent to the first application.

In addition, in some embodiments, when sending the label information to the first server, the first application may further send information such as a user identifier, a trigger type, and an intention identifier, so that the first server collects information statistics.

Based on the foregoing description, the following provides an example of a specific implementation process of determining the information about the second application. FIG. 9A to FIG. 9D are a signaling interaction diagram of a network configuration method according to an embodiment of this application. As shown in FIG. 9A to FIG. 9D, step 21 to step 28 are included.

Step 21: A first application obtains label information of an internet of things device. The label information of the internet of things device may include an identifier of the internet of things device.

Step 22: The first application queries, in a local cache, whether there is information about a second application.

If yes, step 29 is performed; or if no, step 23 is performed.

Step 23: The first application sends the label information and a package name of the first application to a first server. The first server is an HAG server.

Step 24: The first server determines, based on the package name of the first application, whether the first application may be used to trigger the second application.

If yes, step 26 is performed; or if no, step 25 is performed.

Step 25: The first server sends an error prompt to the first application.

Step 26: The first server determines an identifier of a label based on the identifier of the internet of things device in the label information.

Step 27: The first server determines the information about the second application based on the identifier of the label.

Step 28: The first server sends the information about the second application to the first application. The information about the second application includes an application name of the second application and a download address of the second application.

S103: The first application sends the first message to the first service. The first message indicates to start the first service. The first message includes the information about the second application. The first service is used to discover a device to be network-configured.

Still refer to FIG. 9A to FIG. 9D. In some embodiments, S103 may include step 29: The first application sends the first message to the first service through a first interface. For example, the first interface may be a service enabling interface, for example, startService( ). The service enabling interface includes the application name of the second application.

S104: The first service discovers the internet of things device to be network-configured.

It should be understood that discovering the internet of things device to be network-configured in this embodiment of this application may be understood as searching for, by the first service, the internet of things device to be network-configured and establishing a connection between the mobile device and the internet of things device. The internet of things device to be network-configured may perform Bluetooth broadcast. The mobile device may receive, through the first service, Bluetooth information broadcast by the internet of things device to be network-configured, and then the mobile device may discover, through the first service, the internet of things device to be network-configured.

In some embodiments, first duration may further be set for the first service, and the first duration is maximum time in which the first service discovers the internet of things device to be network-configured. If the mobile device successfully discovers, within the first duration, the internet of things device to be network-configured, the mobile device may start the second application through the first service. If the mobile device fails to discover, within the first duration, the internet of things device to be network-configured, the mobile device sends a device discovery failure prompt to the user through the first service.

In addition, in some embodiments, when the mobile device discovers, through the first service, the internet of things device to be network-configured, the first service may synchronously play the device discovery animation on the mobile device. Play duration may be set for the device discovery animation. The play duration may be equal to the first duration, for example, five seconds.

Figure 10A:
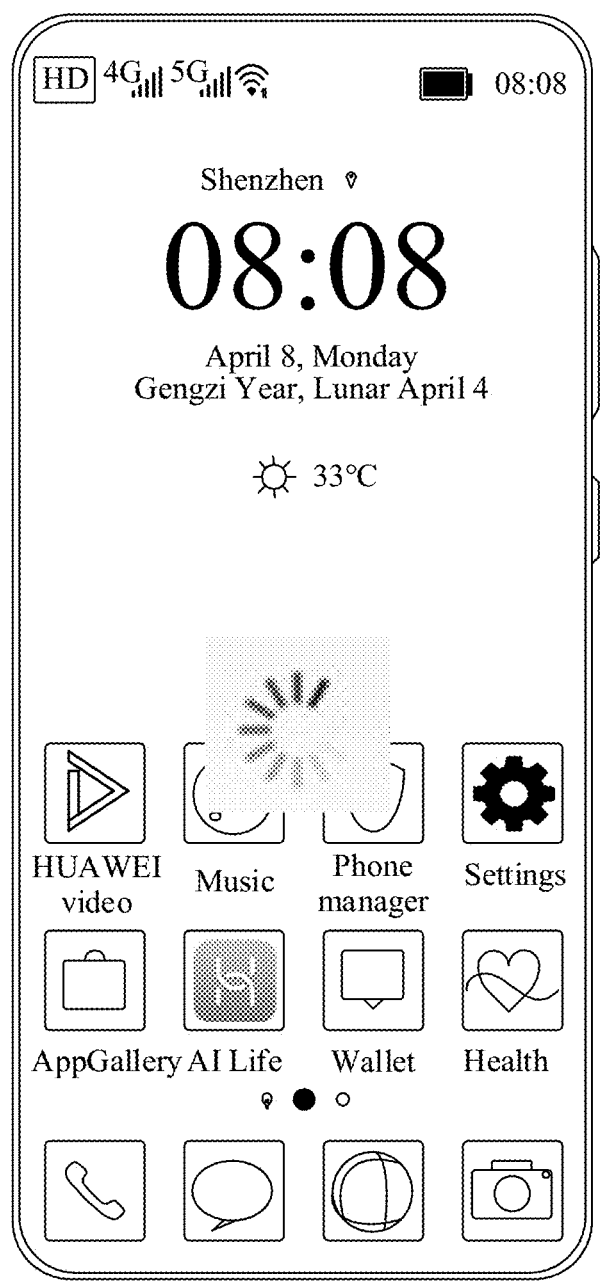
FIG. 10A to FIG. 10C are schematic diagrams of an interface of a first service according to an embodiment of this application.
Figure 10B:
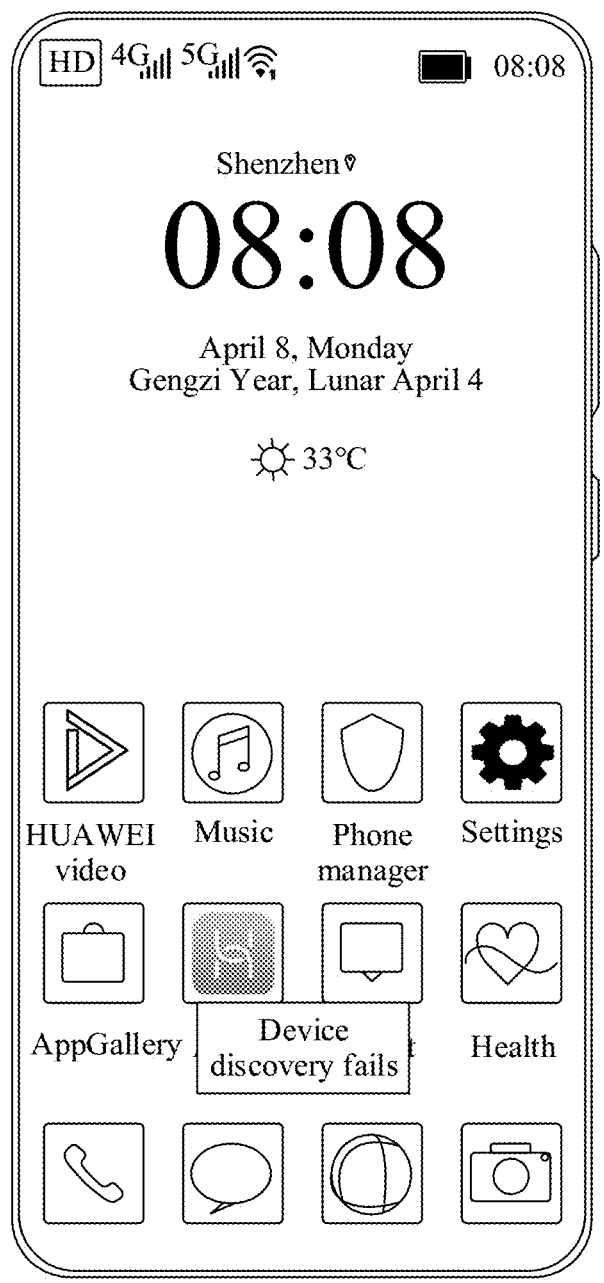
Figure 10C:
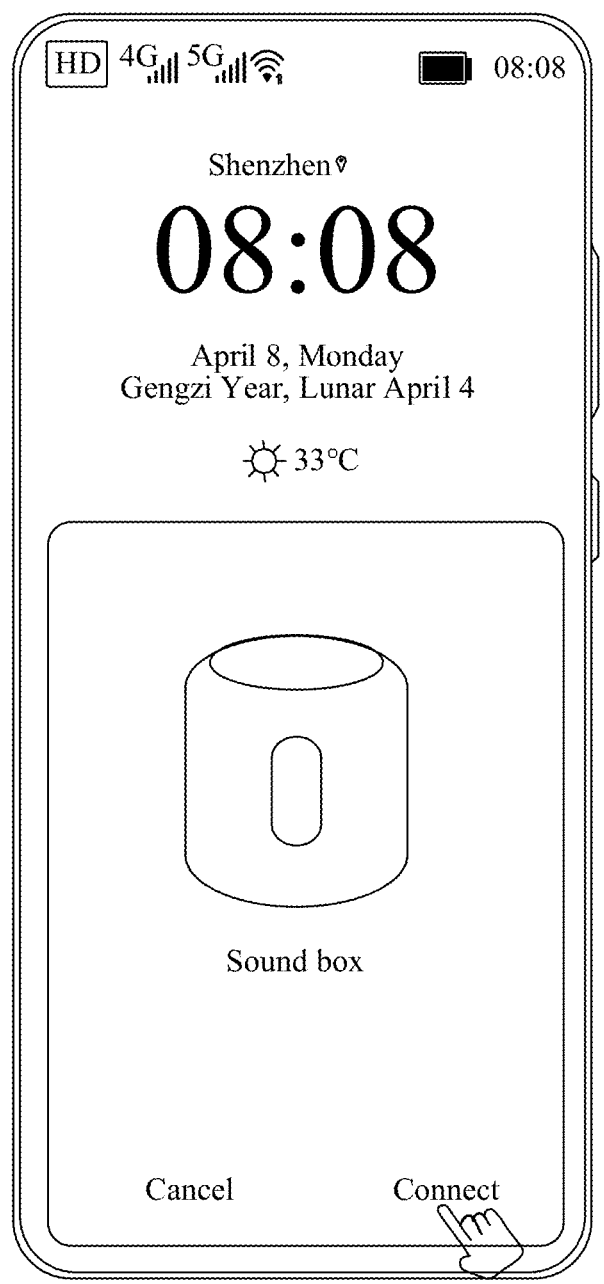

FIG. 10A to FIG. 10C are schematic diagrams of an interface of a mobile device according to an embodiment of this application. For example, as shown in FIG. 10A, after the mobile device touches the sound box, the first service discovers the sound box. In this case, a first interface of the mobile device shown in FIG. 10A is displayed on the mobile device. The first interface of the mobile device may play the device discovery animation. Then, if the sound box is not successfully discovered within the first duration, the first interface of the mobile device may jump to a second interface of the mobile device shown in FIG. 10B. A prompt box is set in the second interface of the mobile device, and is used to prompt the user of a device discovery failure. If the sound box is successfully discovered within the first duration, the first interface of the mobile device may jump to a third interface of the mobile device shown in FIG. 10C, and the third interface of the mobile device displays a name and an image of the sound box. If the user taps a "Connect"

button on the third interface of the mobile device, the mobile device establishes the connection to the discovered internet of things device.

In some embodiments, after the first service discovers the internet of things device to be network-configured, the first service may further obtain information about the internet of things device. It should be noted that the first service may obtain the information about the internet of things device by sending an information obtaining request to the internet of things device. After receiving the information obtaining request sent by the first service, the internet of things device may send the information about the internet of things device to the first service. The information about the internet of things device may include a serial number (SN) of the internet of things device, a session control identifier (e.g., a session ID) of the internet of things device, and the product identifier of the internet of things device.

It should be noted that interaction time between the mobile device and the server is short, and when the mobile device touches the internet of things device, the user can complete step S101 to step S105 of the network configuration method in this application to directly discover the internet of things device to be network-configured, so that the mobile device does not need to touch the internet of things device again after the second application is started. This can reduce a touch process between the mobile device and the internet of things device, and reduce an interaction process between the user and the mobile device. In this way, the user can download and install a network configuration application as required, and an integrated operation for device network configuration is implemented, thereby reducing a network configuration operation procedure and network configuration time, implementing integration of network configuration application download and network configuration, and further improving user experience.

In some embodiments, after network configuration of the internet of things device is completed for the first time, an identifier indicating that the internet of things device is network-configured may be recorded. In a subsequent process in which the mobile device touches the internet of things device, before discovering the internet of things device to be network-configured, the first service may further determine, by detecting whether there is the identifier indicating that the internet of things device is network-configured, whether network configuration of the internet of things device is completed. If yes, the first service does not perform a process of discovering the internet of things device to be network-configured, but directly obtains the information about the internet of things device, and performs step S105.

A second message indicates to start the second application. The second service is used for application query, application download, application installation, and application startup. As shown in FIG. 7, the second service is located at an application framework layer. A fourth server may be the first server, may be the second server, may be a third server, or may be a server of the first service.

It should be noted that how the first service detects whether network configuration of the internet of things device has been completed is not limited in embodiments of this application. For example, after network configuration of the internet of things device is completed for the first time, the identifier indicating that the internet of things device is network-configured may be stored in the local cache. In the subsequent process in which the mobile device touches the internet of things device, the first service may query, in the local cache, whether there is the identifier indicating that the internet of things device is network-configured. For example, after network configuration of the internet of things device is completed for the first time, the identifier indicating that the internet of things device is network-configured may be sent to the fourth server. In the subsequent process in which the mobile device touches the internet of things device, the first service may send a query request to the fourth server. After receiving the query request, if there is the identifier indicating that the internet of things device is network-configured, the fourth server may send the identifier indicating that the internet of things device is network-configured to the first service to indicate that network configuration of the internet of things device has been completed. If there is no identifier indicating that the internet of things device is network-configured, indication information may be sent to the first service to indicate that network configuration of the internet of things device has not been completed.

In this application, before discovering the internet of things device and playing the device discovery animation, the first service detects once whether network configuration of the internet of things device has been completed, so that when a network configuration mode of the internet of things device is enabled by mistake and the mobile device touches the internet of things device, the mobile device may not discover the internet of things device and play the device discovery animation. Therefore, the second application may be quickly started and a home screen of the second application may be directly opened. This improves user experience.

Still refer to FIG. 9A to FIG. 9D. The following provides an example of a specific implementation process of discovering the internet of things device to be network-configured, including steps 30 to 35.

Step 30: The first service checks whether the internet of things device is network-configured.

If yes, step 35 is performed; or if no, step 31 is performed.

Step 31: The first service attempts to discover the internet of things device to be network-configured.

Step 32: The first service plays the device discovery animation.

It should be noted that step 31 and step 32 are performed at the same time.

Step 33: The first service determines whether the internet of things device to be network-configured is discovered within the first duration.

If yes, step 35 is performed; or if no, step 34 is performed.

Step 34: The first service sends the device discovery failure prompt to the user.

Step 35: The first service obtains device information of the internet of things device.

S105: The first service sends the second message to the second service of the mobile device. The second message indicates to start the second application. The second message includes the information about the second application.

In some embodiments, the first service includes a second interface, and the second interface is an application starting interface, for example, StartAlibility( ) Correspondingly, still refer to FIG. 9A to FIG. 9D. S105 may include step S36: The first service sends the second message to the second service of the mobile device through the second interface.

In some other embodiments, the second message may further include the device information, and the second service sends the second message to the second application. The second application stores the information about the internet of things device, including at least one of the serial number of the internet of things device, the session control identifier of the internet of things device, or the product identifier of the internet of things device.

It should be noted that, after the second message is sent to the second service of the mobile device to indicate to start the second application, the mobile device disables the first service.

S106: The second service starts the second application based on the second message.

How the second service starts the second application is not limited in embodiments of this application. In some embodiments, when the second service receives the second message sent by the first service, the second service first detects whether there is the second application in the local cache. If there is the second application, the second application in the local cache is directly started. If there is no second application, a download request is sent to the second server. The download request includes the information about the second application. After determining the application package of the second application based on the information about the second application, the second server sends the application package of the second application to the second service. Then, the second service parses the application package of the second application and installs the second application.

In some embodiments, after detecting that there is the second application in the local cache, the second service first directly starts the second application in the local cache. Then, the second service sends a version number obtaining request to the second server to obtain a latest version number of the second application. After obtaining the latest version number of the second application, the second service may compare the latest version number of the second application with the version number of the locally cached second application. If the latest version number of the second application is inconsistent with the version number of the locally cached second application, the second service requests the second server to download an application package of the second application with the latest version number. If the latest version number of the second application is consistent with the version number of the locally cached second application, the locally cached second application does not need to be updated.

It should be noted that a starting manner of the second application is not limited in embodiments of this application. For example, as shown in FIG. 11E to FIG. 11G, after the second application is installed, the mobile device may start the second application in a half-modal manner.

Figure 11A:
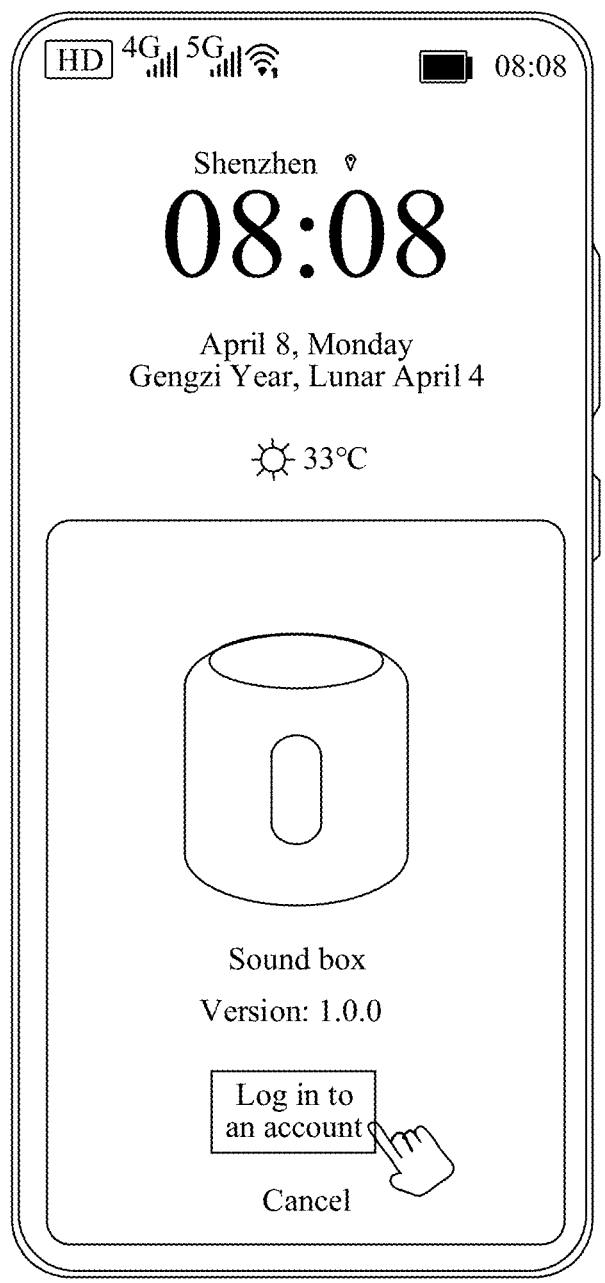
FIG. 11A to FIG. 11G are schematic diagrams of an interface of a second application according to an embodiment of this application.
Figure 11B:
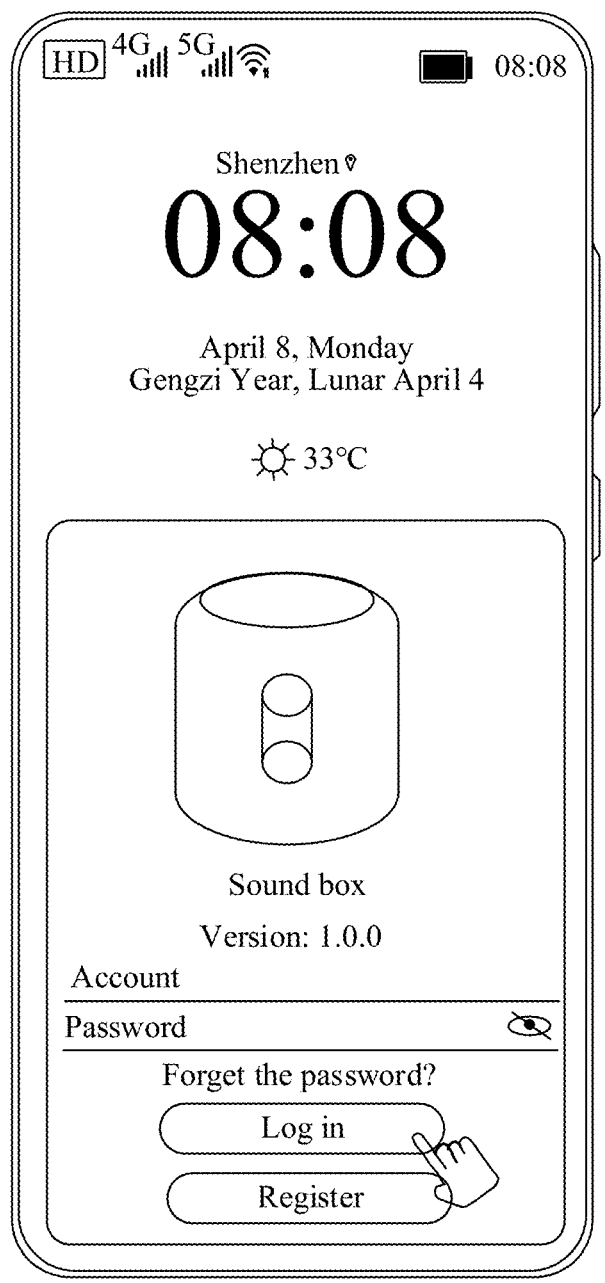
Figure 11C:
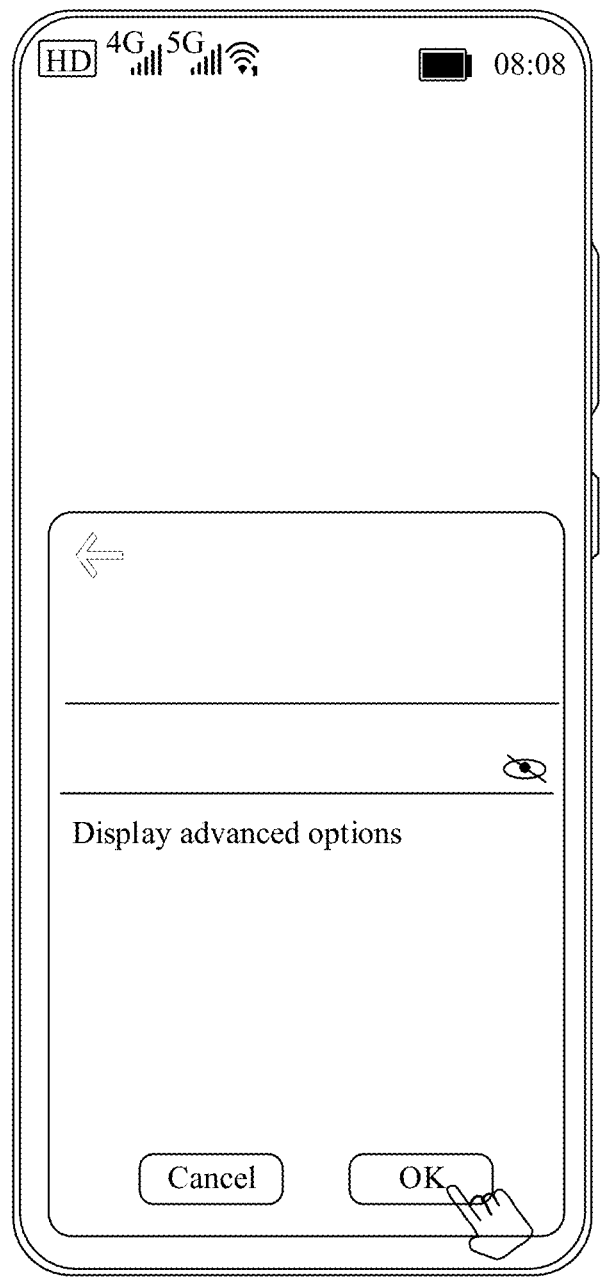

It should be understood that FIG. 11A shows a half-modal dialog box. Half-modal may also be referred to as a half-modal dialog box, and is a dialog box unrelated to another window operation in a unified program. The half-modal dialog box allows the user to interact with a main window and a dialog box of the application at the same time. When the half-modal dialog box is used, the home screen is not blocked, and the user can still perform any operations such as clicking and dragging.

In some embodiments, after the user enables the network configuration mode of the internet of things device and touches the internet of things device by using the mobile device, if network configuration is performed on the internet of things device for the first time, after the second service of the mobile device starts the second application, because neither the local cache nor the fourth server has the identifier indicating that the internet of things device is network-configured, the second application may determine that the internet of things device is not network-configured. Then, the second application may open a network configuration interface of the internet of things device, and the user enters a network configuration account and a password of the network configuration account on the network configuration interface to perform network configuration on the internet of things device. After successful network configuration, the second application sends the network configuration account and the password of the network configuration account to the third server as historical network configuration information. In addition, the second application further stores, in the local cache, the identifier indicating that the internet of things device is network-configured, or sends the identifier indicating that the internet of things device is network-configured to the fourth server through the first service.

After first network configuration is completed, if the internet of things device keeps a network-configured state and the mobile device touches the internet of things device again, after the second service of the mobile device starts the second application, the second application detects again whether the internet of things device is network-configured. Because there is the identifier indicating that the internet of things device is network-configured in the local cache and/or the fourth server, the second application may determine that the internet of things device is network-configured. Then, the second application displays the home screen.

In addition, when the mobile device touches the internet of things device again, the second service starts the second application. In this case, the second application may determine, according to that there is the identifier indicating that the internet of things device is network-configured in neither the local cache nor the fourth server, that the internet of things device is not network-configured. Then, the second application may display the network configuration interface, and request the third server to obtain the historical network configuration information of the internet of things device. The historical network configuration information includes the network configuration account and the password of the network configuration account. After determining that the historical network configuration information of the internet of things device is stored, the third server sends a third message to the second application. The third message carries the network configuration account and the password of the network configuration account. After receiving the third message, the second application may display the network configuration interface, and display the network configuration account and the password of the network configuration account on the network configuration interface. In addition, if there is no historical network configuration information in the third server, the third message sent to the second application is empty.

The identifier, indicating that the internet of things device is network-configured, in the fourth server may be sent to the first service. Then, the first service sends the identifier indicating that the internet of things device is network-configured to the second application.

In addition, in this application, in addition to the identifier indicating that the internet of things device is network-configured, whether the internet of things device is network-configured may be further determined through network configuration information of the internet of things device. For example, if the second application has performed network configuration before, the second application may store the device information of the internet of things device. The device information of the internet of things device may be at least one of the serial number of the internet of things device, the session control identifier of the internet of things device, or the product identifier of the internet of things device. In this case, after the second application receives the device information, sent by the second service, of the internet of things device, if the second application stores the information about the internet of things device, it indicates that network configuration has been performed before. If the second application does not store the device information of the internet of things device, it indicates that network configuration has yet not been performed before.

The device information of the internet of things device may be included in the second message. The second service sends the device information of the internet of things device to the second application.

Figure 8B:
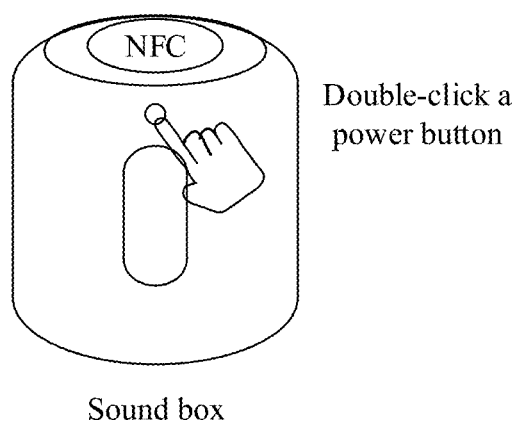
FIG. 8B is a schematic diagram of another scenario according to an embodiment of this application.
Figure 9D:
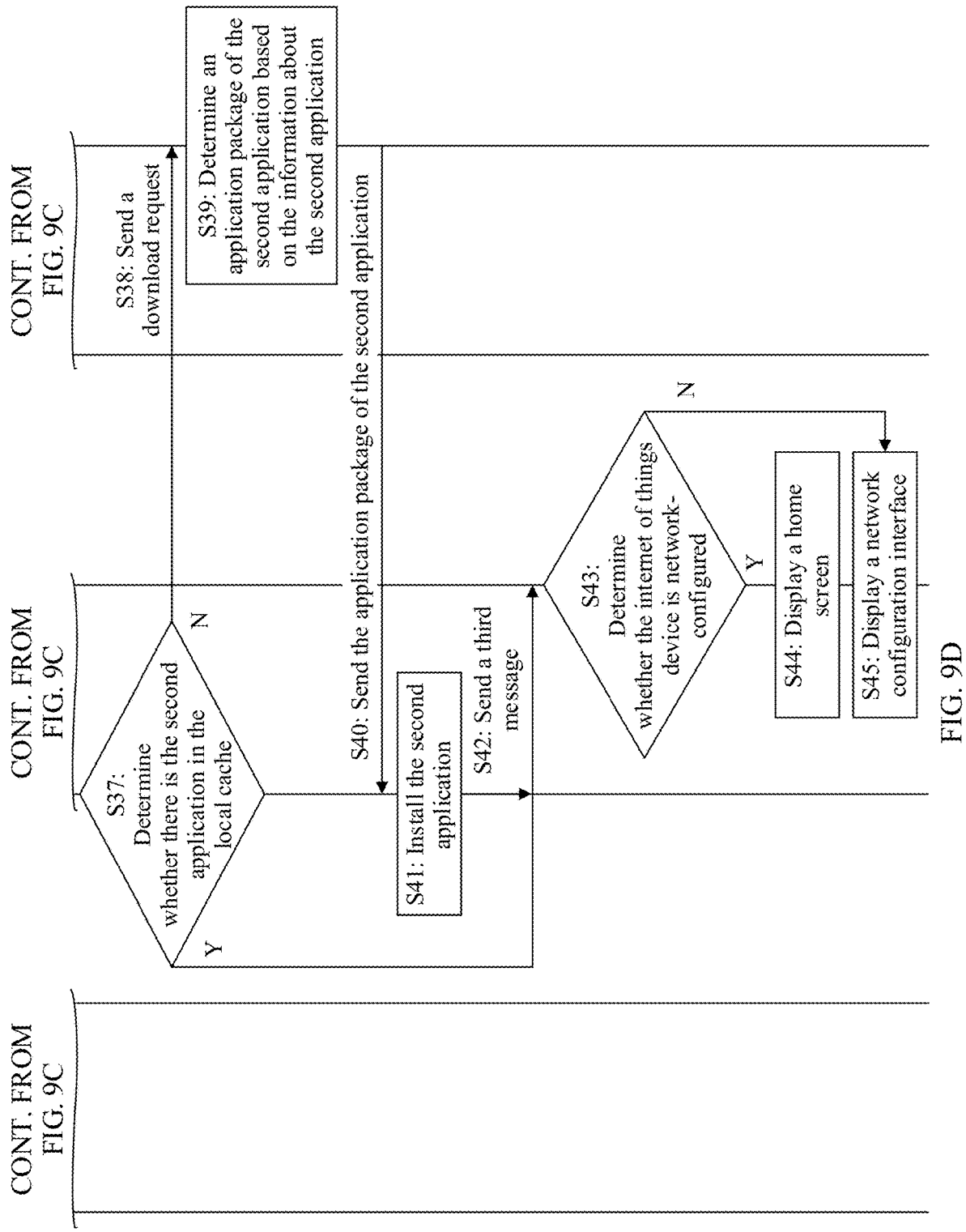

How the internet of things device enters the network configuration mode is not limited in embodiments of this application. For example, the user double-clicks a power button of the internet of things device to enable the network configuration mode of the internet of things device, the user presses and holds a power button of the internet of things device to enable the network configuration mode of the internet of things device, or the user sends, to the internet of things device, a voice instruction for entering the network configuration mode to enable the network configuration mode of the internet of things device. For example, FIG. 8B is a schematic diagram of another scenario according to an embodiment of this application. As shown in FIG. 8B, when the user needs to perform network configuration for the sound box, the user may double-click a power button on the sound box to enable the network configuration mode of the internet of things device.

The third server may be the first server, may be the second server, may be a server of the internet of things device vendor, or may be a server of the second application. The network configuration account and the password of the network configuration account that are carried in the third message may be a latest stored network configuration account and a latest stored password of the network configuration account.

In some other embodiments, before the second application requests to obtain the historical network configuration information of the internet of things device from the third server, the second application may attempt to obtain the historical network configuration information from the local cache, and if the historical network configuration information is successfully obtained from the local cache, does not need to request to obtain the historical network configuration information of the internet of things device from the third server. Time of the historical network configuration information stored in the local cache is not limited in embodiments of this application. In some embodiments, the time may be preset time, for example, 10 minutes. In some other embodiments, the second application may always store the historical network configuration information before the second application is uninstalled.

For example, FIG. 11A to FIG. 11F are schematic diagrams of an interface of a second application according to an embodiment of this application. The half-modal dialog box shown in FIG. 11A is a first interface of the second application, and the first interface of the second application displays a picture of the internet of things device, the name of the internet of things device, the version number of the second application, and a control of logging in to an application account. After it is detected that the user taps the control of logging in to the application account, the first interface of the second application may jump to a second interface of the second application shown in FIG. 11B. On the second interface of the second application, the user enters the application account and a password of the application account to log in. If network configuration is performed on the internet of things device for the first time, after the user taps a "Log in" button in FIG. 11B, the second application displays a network configuration interface shown in FIG. 11C. The network configuration interface requires the user to manually enter the network configuration account and the password of the network configuration account, and tap an "OK" button to complete network configuration. Then, the second application may locally cache the network configuration account and the password that are entered by the user, and may also store the network configuration account and the password that are entered by the user in a cloud, for example, in the first server, the second server, or the third server.

If network configuration is performed not for the first time, after the application account and the password of the application account pass verification, the second application requests to obtain the historical network configuration information of the internet of things device from the third server, and/or the second application may check whether the second application locally stores the historical network configuration information. After the second application receives the third message that is sent by the third server and carries the network configuration account and the password of the network configuration account, or obtains the network configuration account and the password of the network configuration account from the local cache, the second application opens a network configuration interface of the second application shown in FIG. 11D. The network configuration interface directly displays the network configuration account and password of the network configuration account. If determining that the network configuration account and the password of the network configuration account are correct, the user taps the "OK" button to complete wireless network configuration. If the third message received by the second application is empty and the historical network configuration information is not obtained from the local cache, the second application may open a network configuration interface of the second application shown in FIG. 11C. The network configuration interface does not display the network configuration account and the password of the network configuration account, and the user needs to manually enter the network configuration account and the password of the network configuration account. After entering the network configuration account and the password of the network configuration account, the user may tap the "OK" button to complete wireless network configuration. In addition, the second application also caches the newly entered network configuration account and the password of the network configuration account, and/or stores the newly entered network configuration account and password in the cloud. It should be noted that the second application may first check whether the historical network configuration information is locally stored, and when the historical network configuration information is not locally stored, query the historical network configuration information through the third server.

Figure 11D:
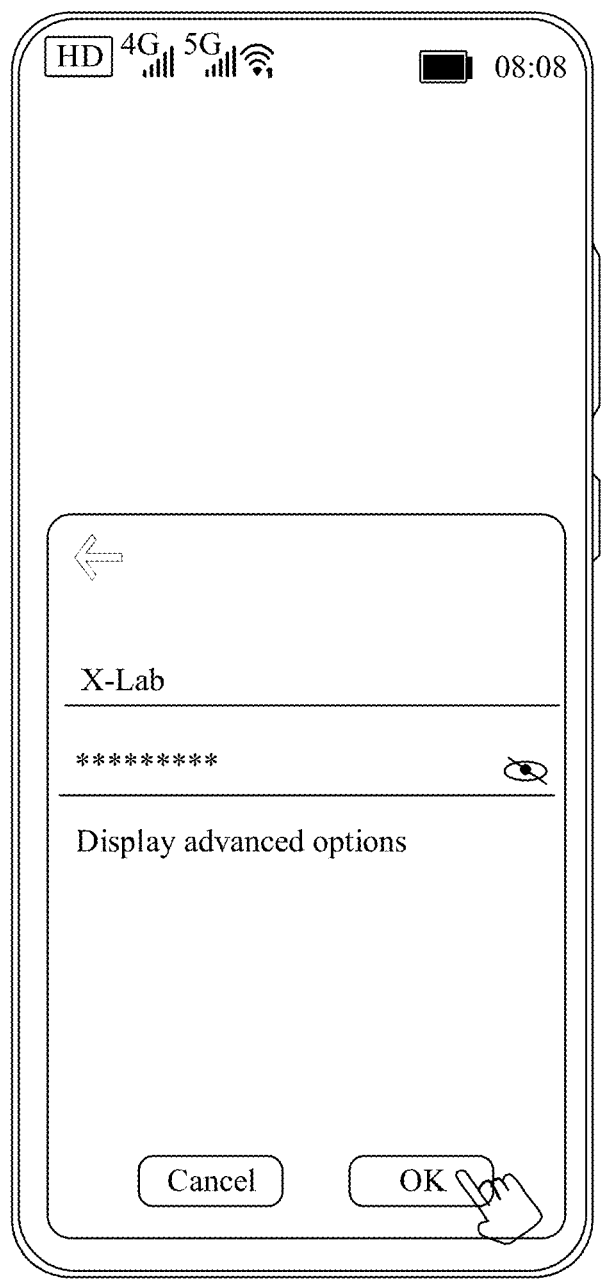
Figure 11E:
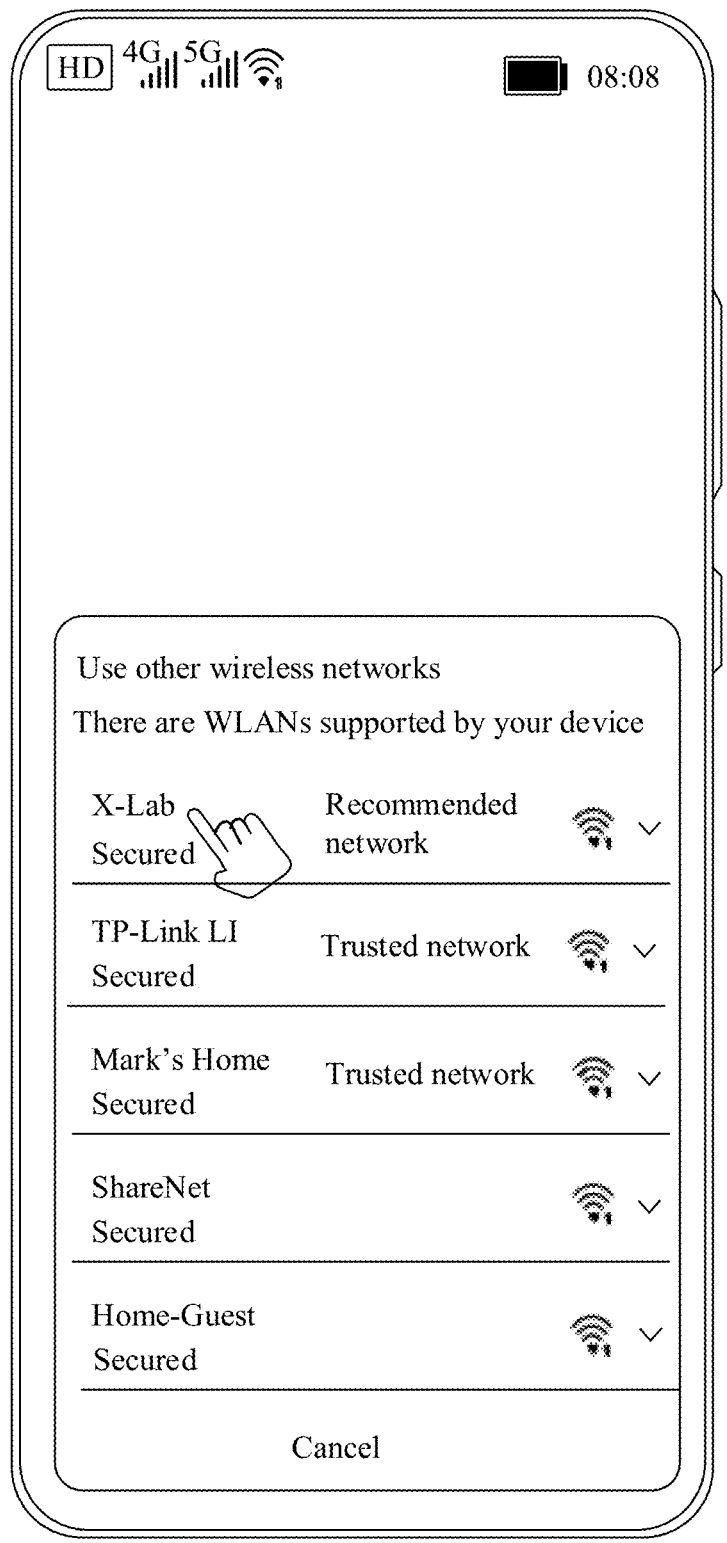
Figure 11F:
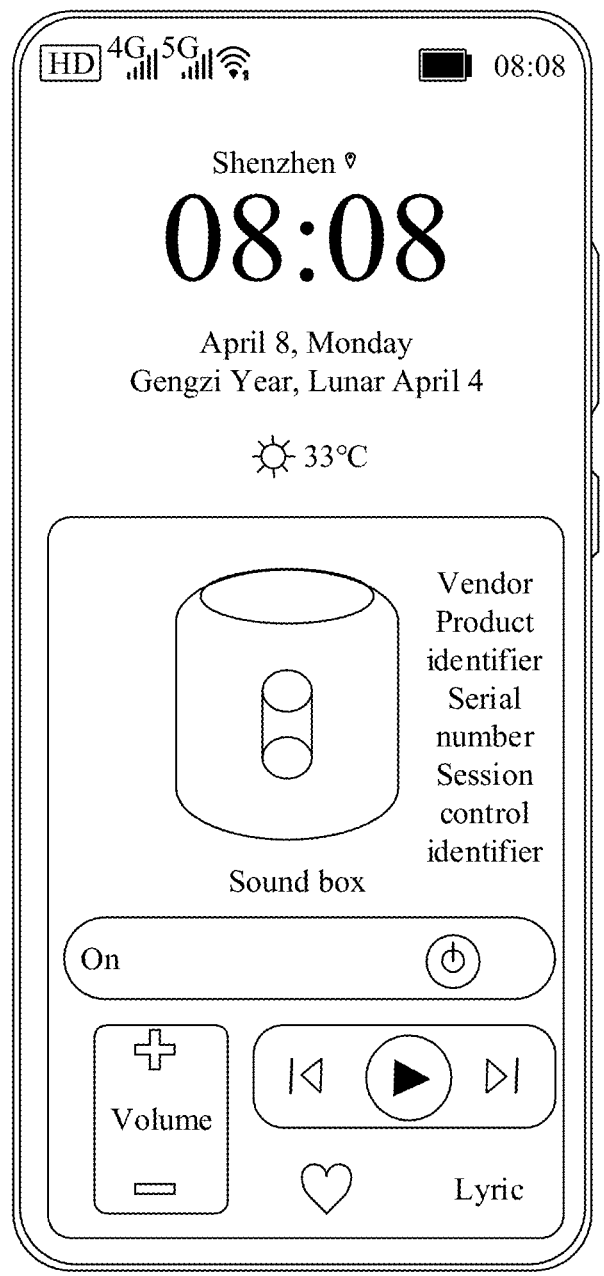
Figure 11G:
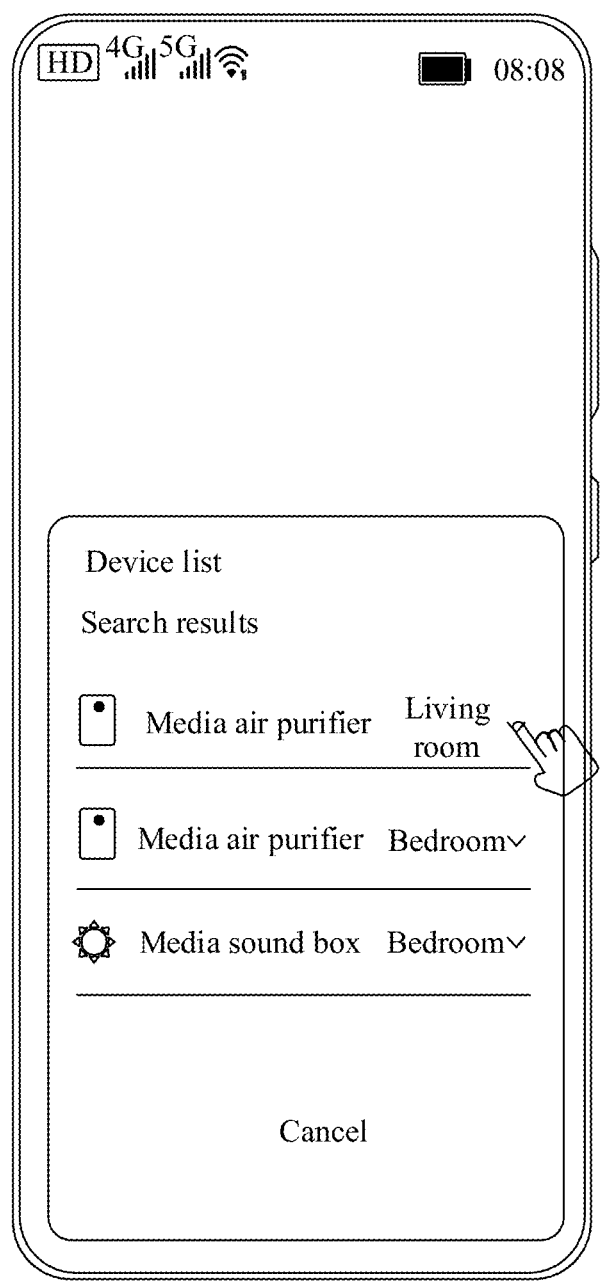

In addition, if needing to view a nearby available Wi-Fi network, the user may tap a first control in a third interface or a fourth interface of the second application. As shown in FIG. 11D, the first control is a "Display advanced options" button. Therefore, the second application opens a fifth interface of the second application shown in FIG. 11E. The fifth interface displays a name of an available Wi-Fi network for the user to select.

In some embodiments, if the second application determines that the internet of things device is not in the network configuration mode, the second application opens a sixth interface of the second application shown in FIG. 11F. The sixth interface is the home screen of the internet of things device. The sixth interface displays an image of the internet of things device, the name of the internet of things device, the information about the internet of things device, and a control of the internet of things device. The user may tap the control of the internet of things device to control the internet of things device.

It should be noted that the foregoing manner of opening the sixth interface of the second application does not constitute a limitation on this application. For example, the sixth interface may be opened through a leftmost screen, or may be opened through another application.

Still refer to FIG. 9A to FIG. 9D. The following provides an example of a specific implementation process of starting the second application, including steps 37 to 44.

Step 37: The second service determines whether there is the second application in the local cache.

If yes, step 42 is performed; or if no, step 38 is performed.

Step 38: The second service sends the download request to the second server. The download request includes the information about the second application.

Step 39: The second server determines the application package of the second application based on the information about the second application.

Step 40: The second server sends the application package of the second application to the second service.

Step 41: The second service installs the second application.

Step 42: The second service sends the third message to the second application. The third message indicates to start the second application.

Step 43: The second application determines whether the internet of things device is network-configured.

If yes, step 44 is performed; or if no, step 45 is performed.

Step 44: The second application displays the home screen.

Step 45: The second application displays the network configuration interface.

The network configuration method provided in this embodiment of this application is applied to a mobile device. The mobile device includes a first application, a first service, and a second service. The method includes: The first application obtains label information of an internet of things device to be network-configured. The first application obtains information about a second application. The second application is used to configure a network for the internet of things device. The first application sends a first message to the first service. The first message indicates to start the first service. The first message includes the information about the second application. The first service discovers the internet of things device to be network-configured. The first service sends a second message to the second service. The second message indicates to start the second application. The second message includes the information about the second application. The second service starts the second application based on the second message. Compared with the conventional technology, in the device network configuration method provided in this application, a user can download and install a network configuration application as required, and an integrated operation for device network configuration is implemented, thereby reducing network configuration operation steps and network configuration time, implementing integration of network configuration application download and network configuration, and further improving user experience.

Figure 12:
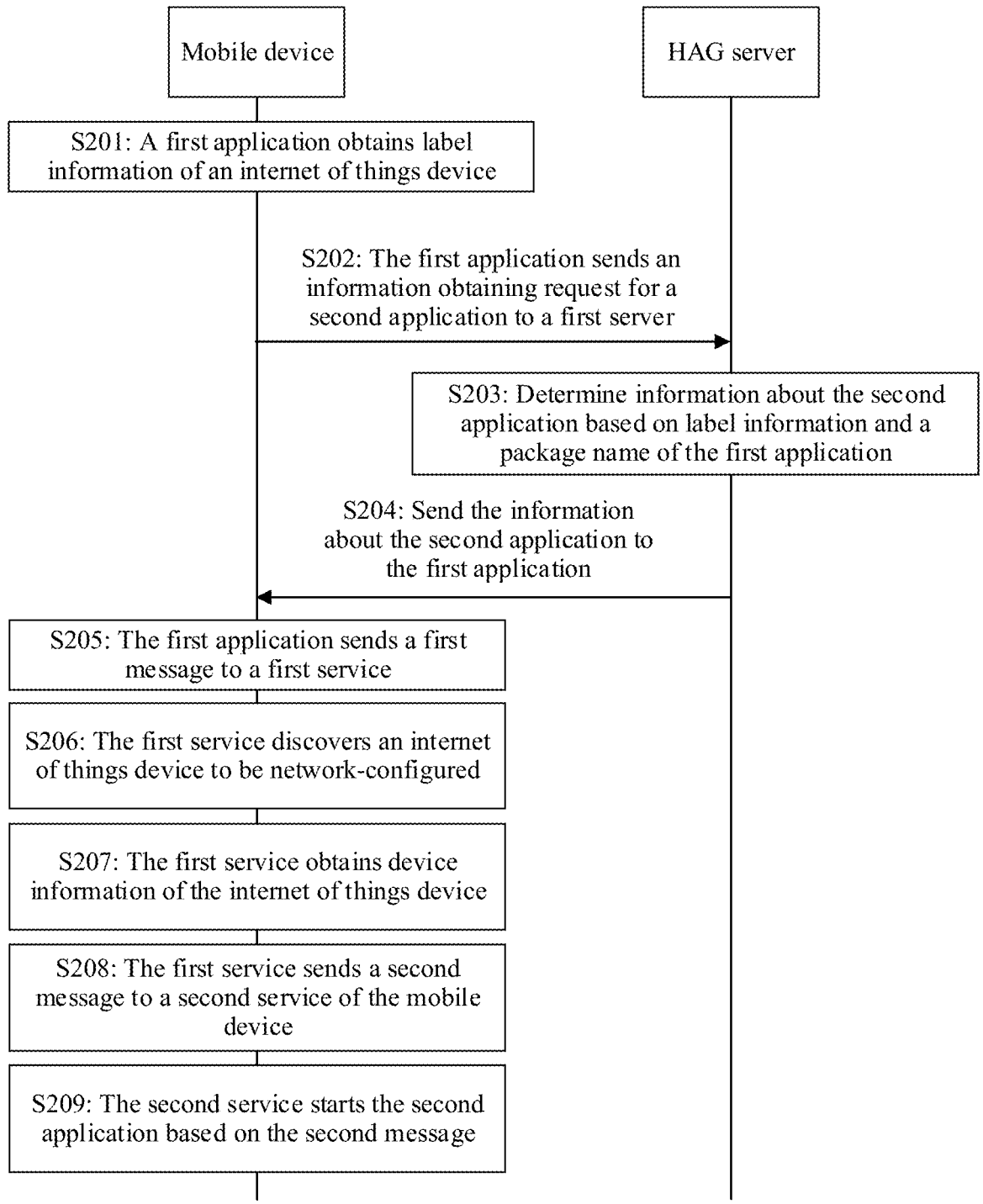
FIG. 12 is a schematic signaling diagram of another network configuration method according to an embodiment of this application.

Based on the foregoing description, FIG. 12 is a schematic signaling diagram of another network configuration method according to an embodiment of this application.

With reference to FIG. 12, when the mobile device determines the information about the internet of things device FA through interaction by using a server, the network configuration method in this application may include the following steps.

S201: The first application obtains the label information of the internet of things device.

S202: The first application sends an information obtaining request for the second application to the first server. The information obtaining request includes the label information and the package name of the first application.

S203: The first server determines the information about the second application based on the label information and the package name of the first application.

S204: The first server sends the information about the second application to the first application.

S205: The first application sends the first message to the first service. The first message indicates to start the first service. The first message includes the information about the second application.

S206: The first service discovers the internet of things device to be network-configured.

S207: The first service obtains the device information of the internet of things device.

S208: The first service sends the second message to the second service of the mobile device. The second message indicates to start the second application. The second message includes the information about the second application and the device information of the internet of things device.

S209: The second service starts the second application based on the second message.

For understanding of technical terms, technical effects, technical features, and optional implementations of S201 to S209, refer to S101 to S106 shown in FIG. 7. Repeated content is not described herein again.

Figure 13:
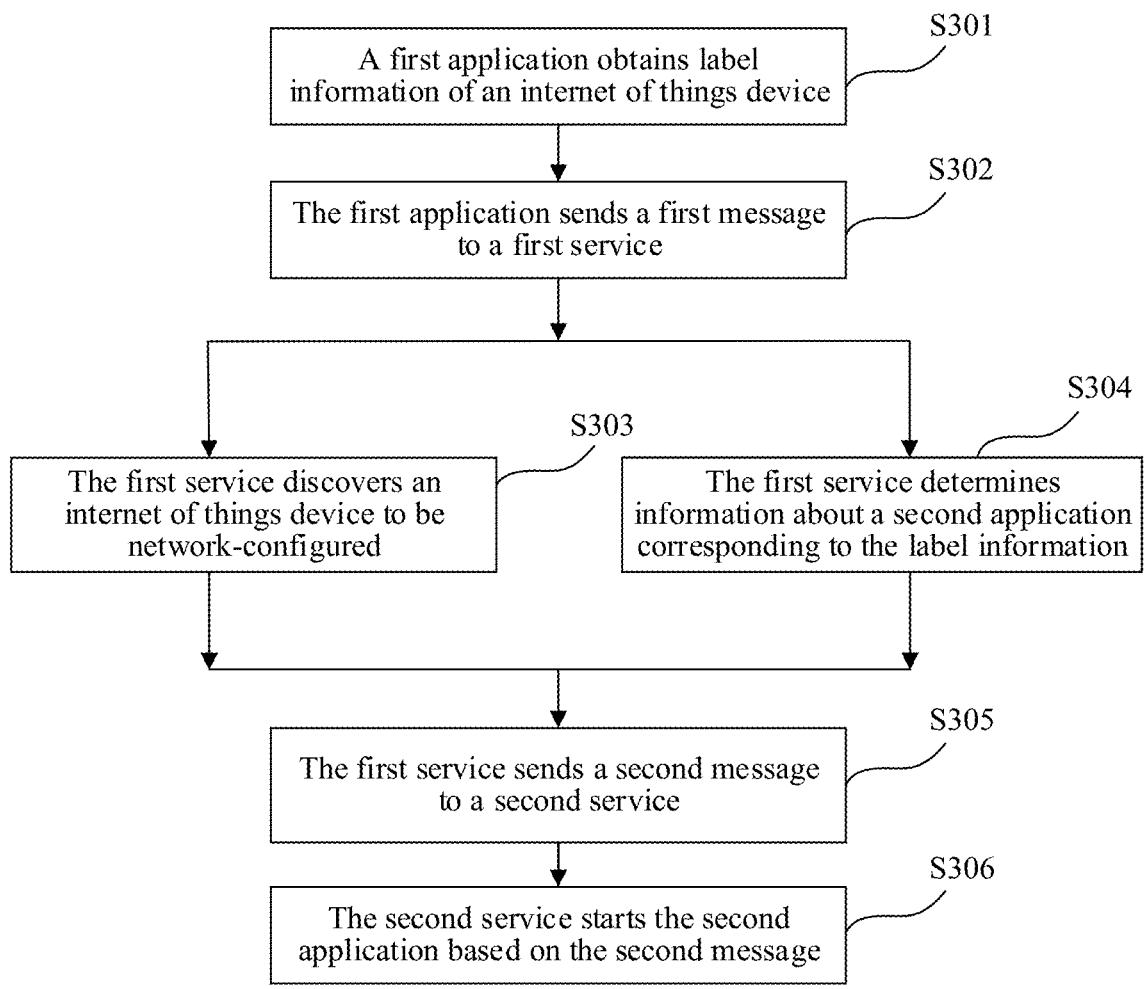
FIG. 13 is a signaling interaction diagram of still another network configuration method according to an embodiment of this application.

Based on the foregoing embodiment, the first service may interact with the first server to obtain the information about the second application. In addition, the first service may synchronously discover the internet of things device to be network-configured. Therefore, network configuration time is further reduced. FIG. 13 is an interaction flowchart of still another network configuration method according to an embodiment of this application. With reference to FIG. 13, the network configuration method in this application may include the following steps.

S301: The first application obtains the label information of the internet of things device.

S302: The first application sends the first message to the first service. The first message indicates to start the first service. The first message includes the label information.

A difference from the network configuration method in FIG. 6 lies in that, in this embodiment, after obtaining the label information of the internet of things device, the first application may directly start the first service, and send the label information to the first service, and then the first service interacts with the first server, so as to obtain the information about the second application.

S303: The first service discovers the internet of things device to be network-configured.

S304: The first service determines the information about the second application corresponding to the label information.

It should be noted that steps S303 and S304 may be performed concurrently.

S305: The first service sends the second message to the second service. The second message indicates to start the second application. The second message includes the information about the second application.

S306: The second service starts the second application based on the second message.

For understanding of technical terms, technical effects, technical features, and optional implementations of S301 to S306, refer to S101 to S106 shown in FIG. 7. Repeated content is not described herein again.

According to the network configuration method provided in this embodiment of this application, when the first service discovers the internet of things device to be network-configured, the first service determines the information about the second application corresponding to the label information, so that time for the mobile device to touch the internet of things device is reduced, and the network configuration time is reduced.

Figure 14A:
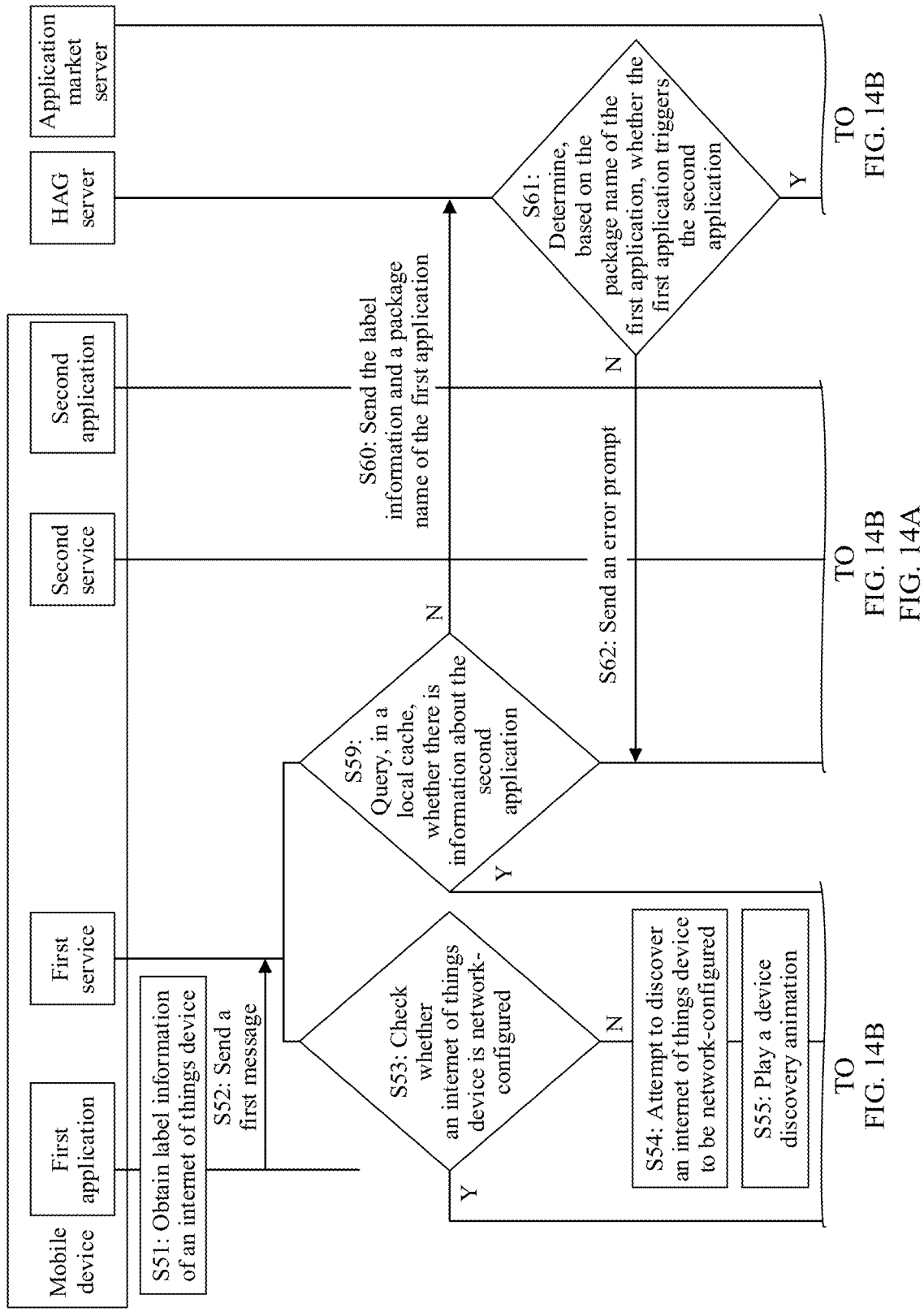
Figure 14B:
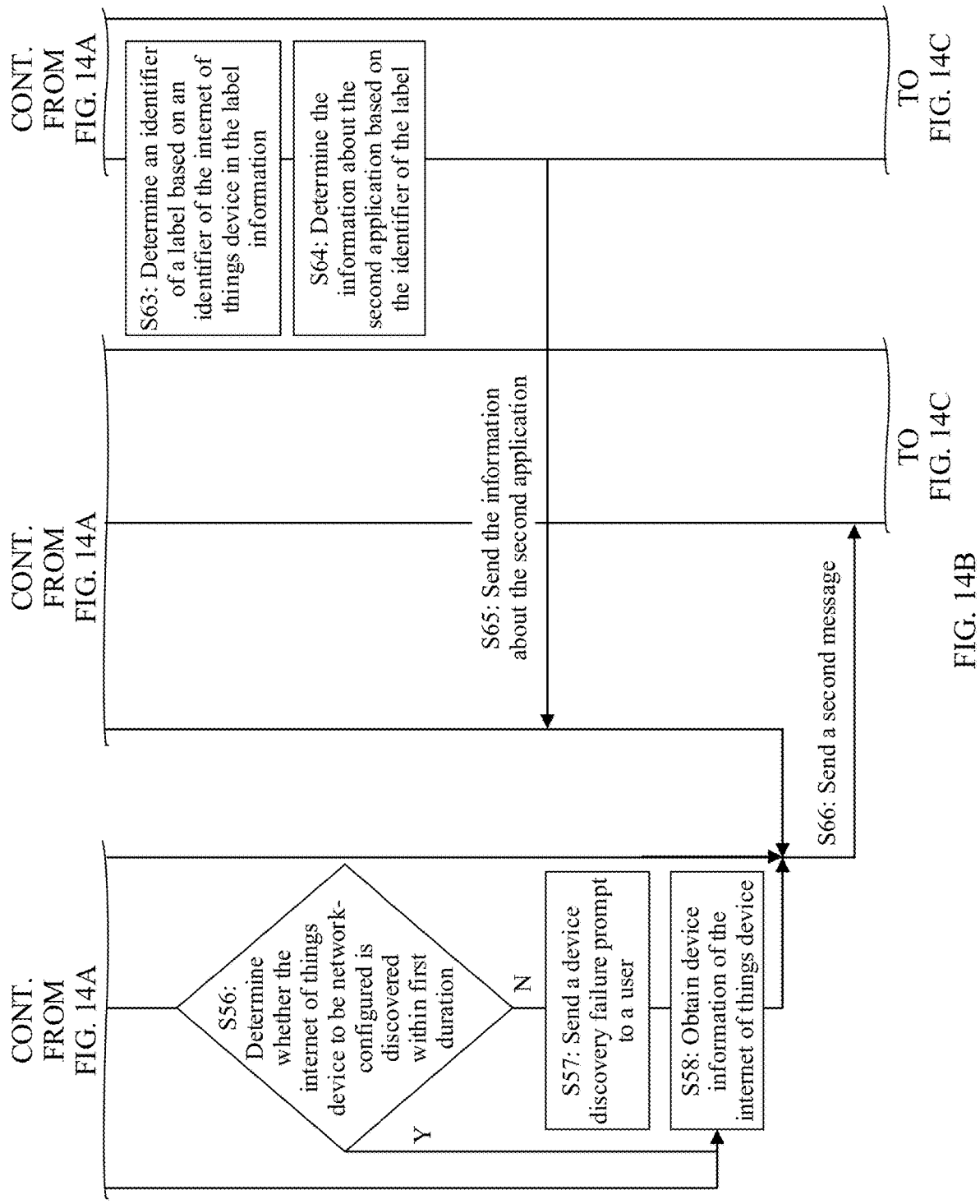

Based on the foregoing description, FIG. 14A to FIG. 14C are a schematic signaling diagram of yet another network configuration method according to an embodiment of this application. With reference to FIG. 14A to FIG. 14C, the network configuration method in this application may include the following steps.

Step 51: The first application obtains the label information of the internet of things device. The label information of the internet of things device may include the identifier of the internet of things device.

Step 52: The first application sends the first message to the first service. The first message indicates to start the first service. The first message includes the label information and the package name of the first application. The first service is used to discover a device to be network-configured.

Step 53: The first service checks whether the internet of things device is network-configured.

If no, step 54 is performed; or if yes, step 58 is performed.

Step 54: The first service attempts to discover the internet of things device to be network-configured.

Step 55: The first service plays the device discovery animation.

Step 56: The first service determines whether the internet of things device to be network-configured is discovered within the first duration.

If yes, step 58 is performed; or if no, step 57 is performed.

Step 57: The first service sends the device discovery failure prompt to the user.

Step 58: The first service obtains the device information of the internet of things device.

Step 59: The first service queries, in the local cache, whether there is the information about the second application. The information about the second application includes the application name of the second application and the download address of the second application.

If yes, step 66 is performed; or if no, step 60 is performed.

Step 60: The first service sends the label information and the package name of the first application to the first server. The first server is an HAG server.

Step 61: The first server determines, based on the package name of the first application, whether the first application is used to trigger the second application.

If yes, step 63 is performed; or if no, step 62 is performed.

Step 62: The first server sends the error prompt to the first service.

Step 63: The first server determines the identifier of the label based on the identifier of the internet of things device in the label information.

Step 64: The first server determines the information about the second application based on the identifier of the label.

Step 65: The first server sends the information about the second application to the first service.

It should be noted that steps 53 to 58 are performed concurrently with steps 59 to 65, that is, device discovery and obtaining the information about the second application may be performed concurrently.

Step 66: The first service sends the second message to the second service of the mobile device through the second interface. The second message includes the information about the second application and the device information.

Step 67: The second service determines whether there is the second application in the local cache.

If yes, step 72 is performed; or if no, step 68 is performed.

Step 68: The second service sends the download request to the second server. The download request includes the information about the second application.

Step 69: The second server determines the application package of the second application based on the information about the second application.

Step 70: The second server sends the application package of the second application to the second service.

Step 71: The second service installs the second application.

Step 72: The second service sends the third message to the second application. The third message indicates to start the second application.

Step 73: The second application determines whether the internet of things device is network-configured.

If yes, step 74 is performed; or if no, step 75 is performed.

Step 74: The second application displays the home screen.

Step 75: The second application displays the network configuration interface.

For understanding of technical terms, technical effects, technical features, and optional implementations of S51 to S76, refer to S101 to S107 shown in FIG. 7. Repeated content is not described herein again.

Figure 15:
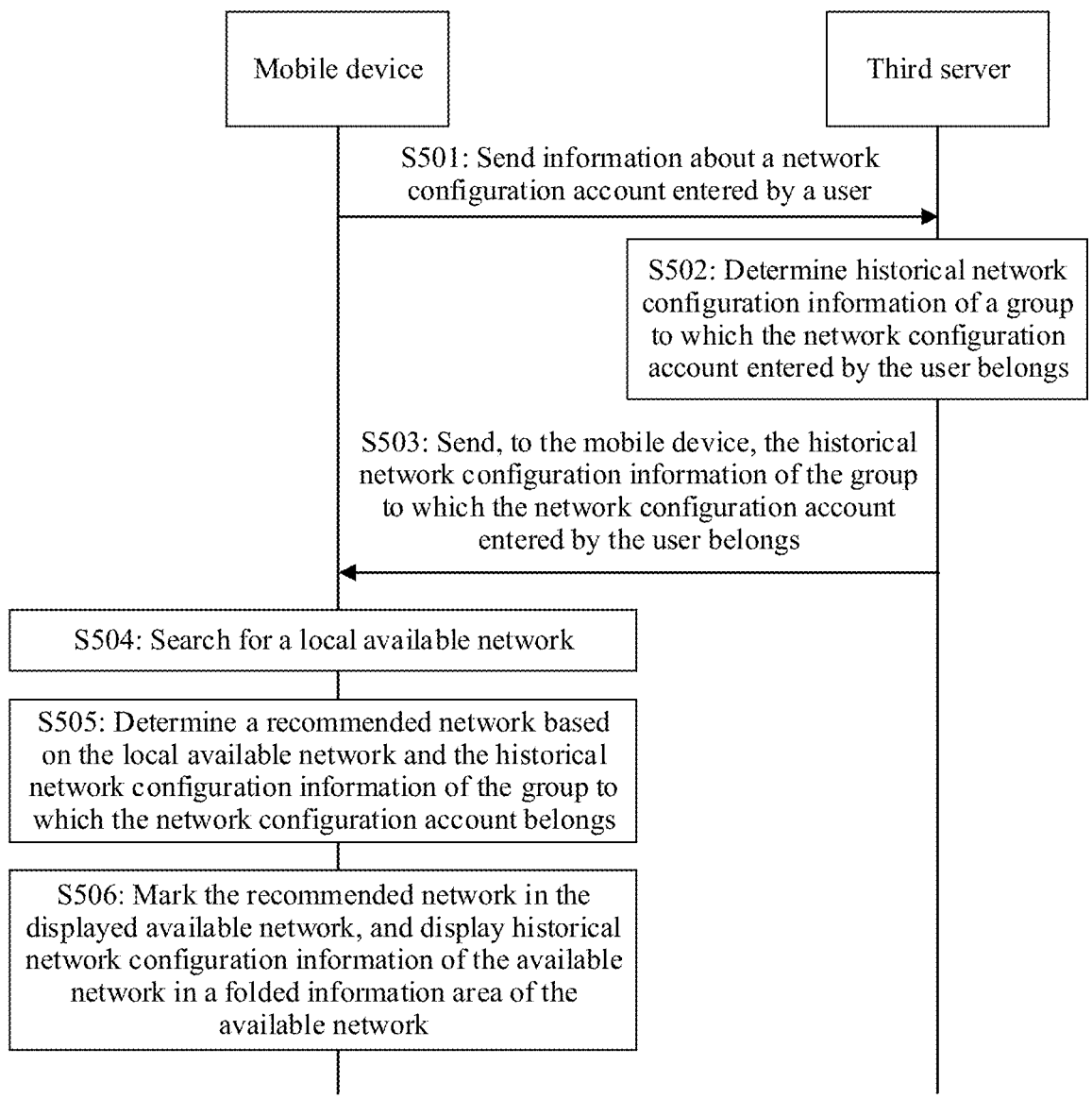
FIG. 15 is a signaling interaction diagram of still yet another network configuration method according to an embodiment of this application.

In a related technology, a same Wi-Fi network may be configured for internet of things devices of a same brand or a same type, so as to perform classification management. However, if there are a plurality of Wi-Fi networks in an area, a user cannot determine, from the plurality of Wi-Fi networks, a Wi-Fi network for network configuration of the internet of things device. To resolve the foregoing problem, an embodiment of this application provides a network configuration method, so as to provide a recommended network for the user. FIG. 15 is a signaling interaction diagram of still yet another network configuration method according to an embodiment of this application. With reference to FIG. 15, the network configuration method in this application may include the following steps.

S501: A mobile device sends, to a third server, information about a network configuration account entered by the user.

It should be understood that the third server may be a first server, may be a second server, or may be a server of an internet of things device vendor, and the information about the network configuration account includes a name of the network configuration account.

How the mobile device obtains the information about the network configuration account is not limited in embodiments of this application. In some embodiments, after the user enters the network configuration account and a password on a second interface of a second application to complete login, the mobile device may send the information about the network configuration account entered by the user to the third server. In some other embodiments, if the information about the network configuration account is also stored in a local buffer of the mobile device, the mobile device directly obtains the information about the network configuration account, and sends the information about the network configuration account to the third server.

S502: The third server determines historical network configuration information of a group to which the network configuration account entered by the user belongs.

It should be understood that the historical network configuration information includes the name of the network configuration account, a user name, the internet of things device vendor, a type of an internet of things device, a name of the internet of things device, a product serial number (SN) of the internet of things device, an alias of the internet of things device, and the like. In this application, each time the second application is used to configure a network for the internet of things device, the third server collects, through the second application, network configuration information of current network configuration, and stores the network configuration information as historical network configuration information.

It should be understood that, because network configuration accounts used by users who perform network configuration for internet of things devices in a same area are not necessarily the same, network configuration accounts of a same type may be divided into a group, for example, a working group or a family group. Historical network configuration information of the network configuration accounts in the same group may be used as a reference for network configuration for another network configuration account in the group. Therefore, after receiving the information about the network configuration account entered by the user, the third server may determine the historical network configuration information of the group to which the network configuration account entered by the user belongs.

How to determine the group to which the network configuration account belongs is not limited in embodiments of this application. For example, the group to which the network configuration account entered by the user belongs may be determined based on a mapping relationship, prestored in the third server, between a network configuration account and a group.

S503: The third server sends, to the mobile device, the historical network configuration information of the group to which the network configuration account entered by the user belongs.

S504: The mobile device searches for a local available network.

It should be understood that after the user enters the information about the network configuration account in the second application and the mobile device establishes a connection to the internet of things device, the mobile device may search for the local available network. A manner in which the mobile device establishes the connection to the internet of things device may be the same as that in the foregoing embodiment, and details are not described herein again.

How the mobile device searches for the local available network is not limited in embodiments of this application, and may be specifically set based on an actual situation.

S505: The mobile device determines a recommended network based on the local available network and the historical network configuration information of the group to which the network configuration account belongs.

It should be understood that, based on the historical network configuration information of the group to which the network configuration account belongs, the mobile device may determine that a network configured for an internet of things device associated with the internet of things device on which network configuration is being performed is the recommended network. For example, a network used for an internet of things device of a same brand may be used as the recommended network. For example, a network used for an internet of things device of a same type may be used as the recommended network.

In some embodiments, after the recommended network is determined, signal strength of the recommended network may be further detected. If the signal strength of the network is less than a threshold, it is determined that the recommended network is invalid, and another recommended network is selected. If the signal strength of the network is greater than a threshold, it is determined that the recommended network is valid.

S506: The mobile device marks the recommended network in the displayed available network, and displays historical network configuration information of the available network in a folded information area of the available network.

In this application, after determining the recommended network, the mobile device may add an identifier of the recommended network after the displayed recommended network, so as to distinguish from another available network. It should be noted that a type of the identifier of the recommended network is not limited in embodiments of this application, and may be specifically set based on an actual situation.

Still refer to FIG. 11E. In a fifth interface of the second application shown in FIG. 11E, recommended network information, for example, a word "Recommended network", is marked on the recommended network "X-Lab", so as to identify that the network is a network that is recommended for network configuration. In addition, in the fifth interface of the second application, for an available network other than the recommended network, a trusted network configured for another internet of things device may be further identified by using an identifier of a word "Trusted network".

In some other embodiments, a folded information area is set for each available network in the fifth interface of the second application, and the folded information area may display historical network configuration information of the corresponding available network. The folded information area contains the historical network configuration information. The historical network configuration information may include a device vendor of the network, a device type for which the network is configured, a device name for which the network is configured, a network user for which the network is configured, and other information. The historical network configuration information in the folded information area may assist the user in determining the network for network configuration of the internet of things device.

Figure 16A:
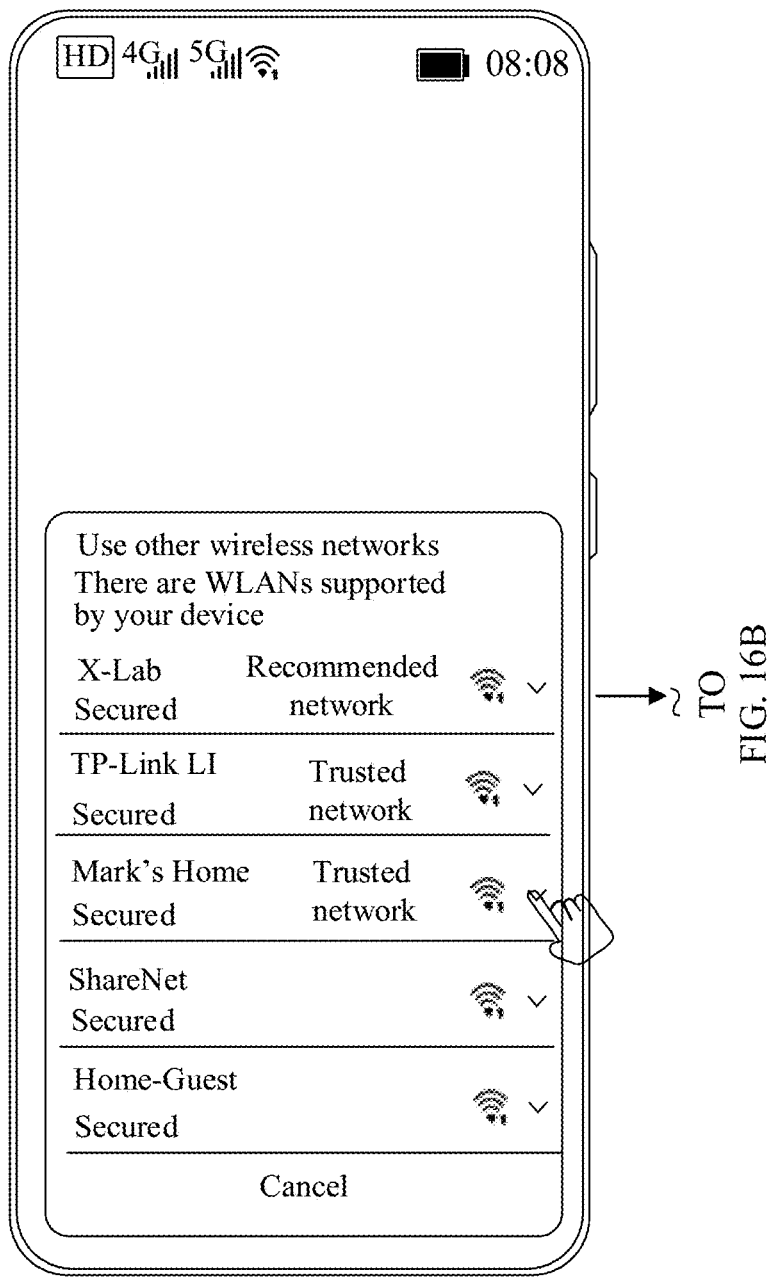
FIG. 16A and FIG. 16B are a schematic diagram of expanding a folded information area according to an embodiment of this application.
Figure 16B:
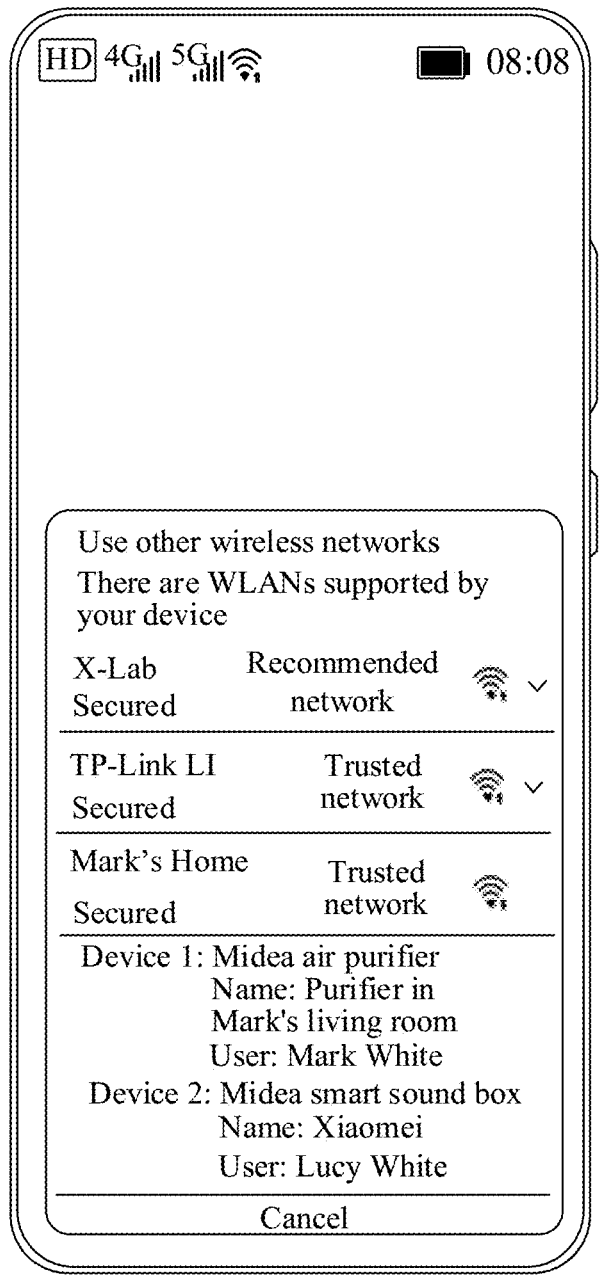

The fifth interface may be a network details interface. The network details interface includes a second control corresponding to a target network. After receiving a second operation performed by the user on the second control, the second application expands, in response to the second operation, the folded information area of the target network on the network details interface. As shown in FIG. 16A and FIG. 16B, the second control may be a control tapped by a finger of the user in the figure. The user may tap the second control for expanding the folded information area after the selected network on the network details interface, so as to expand the folded information area of the selected network, and display the historical network configuration information in the folded information area.

According to the network configuration method provided in this embodiment of this application, the mobile device first sends, to the third server, the information about the network configuration account entered by the user. Then, the third server determines the historical network configuration information of the group to which the network configuration account entered by the user belongs, and sends the historical network configuration information to the mobile device. Next, the mobile device searches for the local available network, and determines the recommended network based on the local available network and the historical network configuration information of the group to which the network configuration account belongs. Finally, the mobile device marks the recommended network in the displayed available network, and displays the historical network configuration information of the available network in the folded information area of the available network. Compared with the conventional technology, when the user performs network configuration, the recommended network may be determined based on the historical network configuration information, thereby improving network configuration efficiency. In addition, the folded information area may display an IoT device for which the network is configured, so as to facilitate network configuration and management of IoT devices.

Based on the foregoing description, the second application provided in this application may further display information about the internet of things device, so that the user can quickly find the internet of things device. After network configuration is completed, the second application may open a seventh interface of the second application shown in FIG. 11G. A list of internet of things devices is displayed on the seventh interface of the second application. The list of the internet of things devices may display names, brands, locations, and pictures of the internet of things devices. A folded information area is set for each internet of things device. The folded information area may display information about the IoT device. The information about the internet of things device includes at least one of the following: a network configuration user, network configuration time, a historical user for a critical event, user operation content, and a use frequency of the user.

Figure 17A:
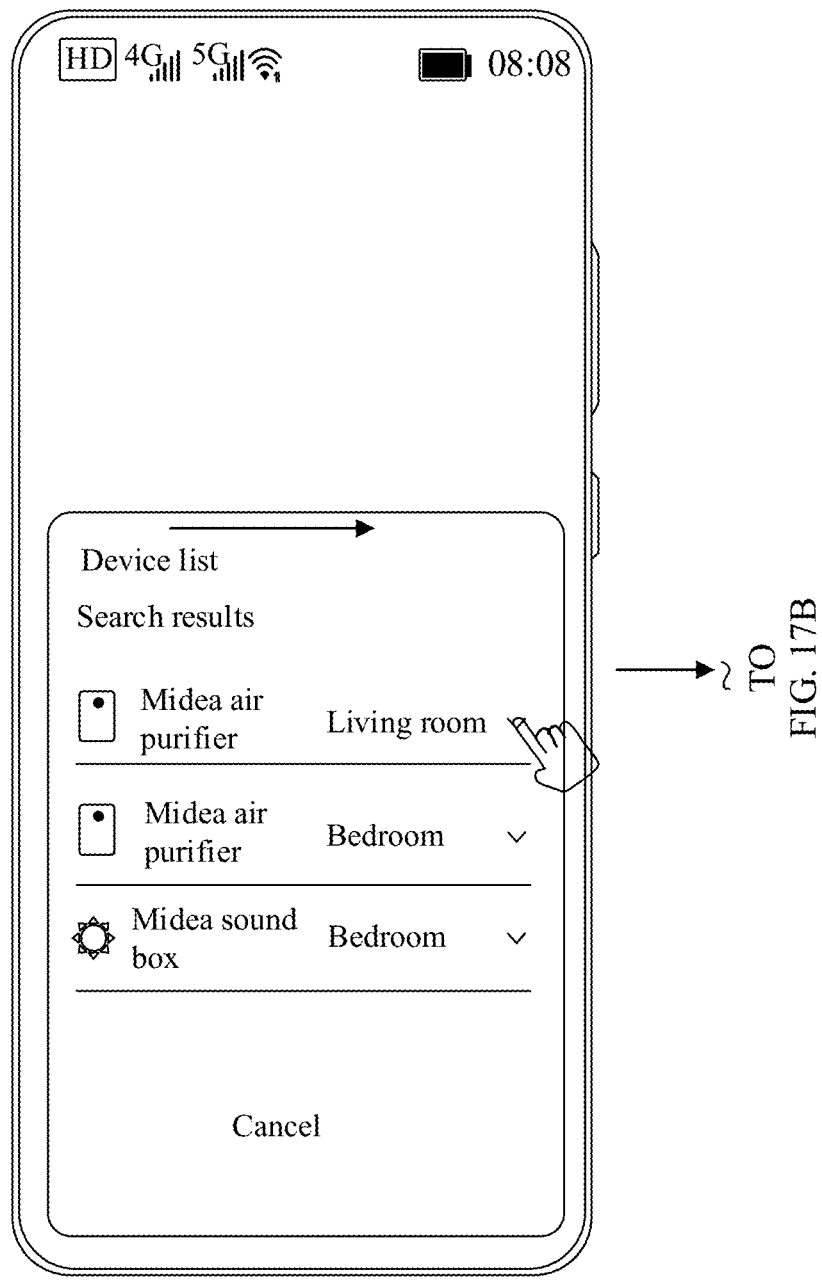
FIG. 17A and FIG. 17B are another schematic diagram of expanding a folded information area according to an embodiment of this application.
Figure 17B:
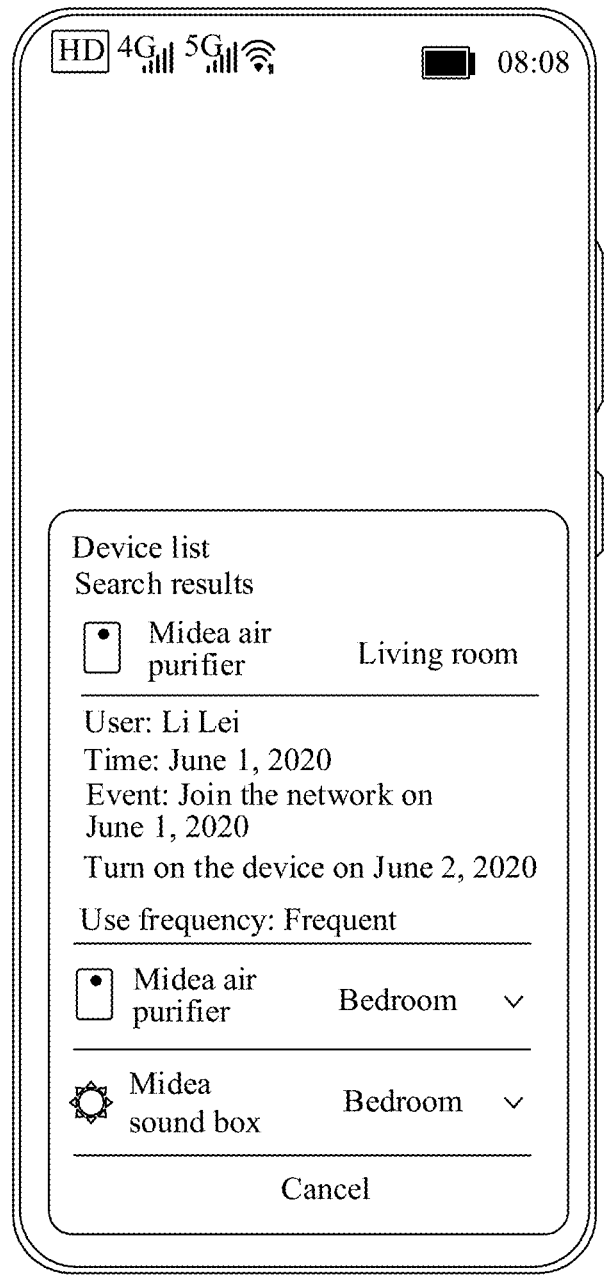

For example, FIG. 17A and FIG. 17B are another schematic diagram of expanding a folded information area according to an embodiment of this application. As shown in FIG. 17A and FIG. 17B, the user may tap a second control for expanding the folded information area after a to-be-queried internet of things device in a sixth interface of the second application shown in FIG. 17A and FIG. 17B, so as to expand the folded information area of the to-be-queried internet of things device, and display information about the to-be-queried internet of things device in the folded information area.

Figure 18:
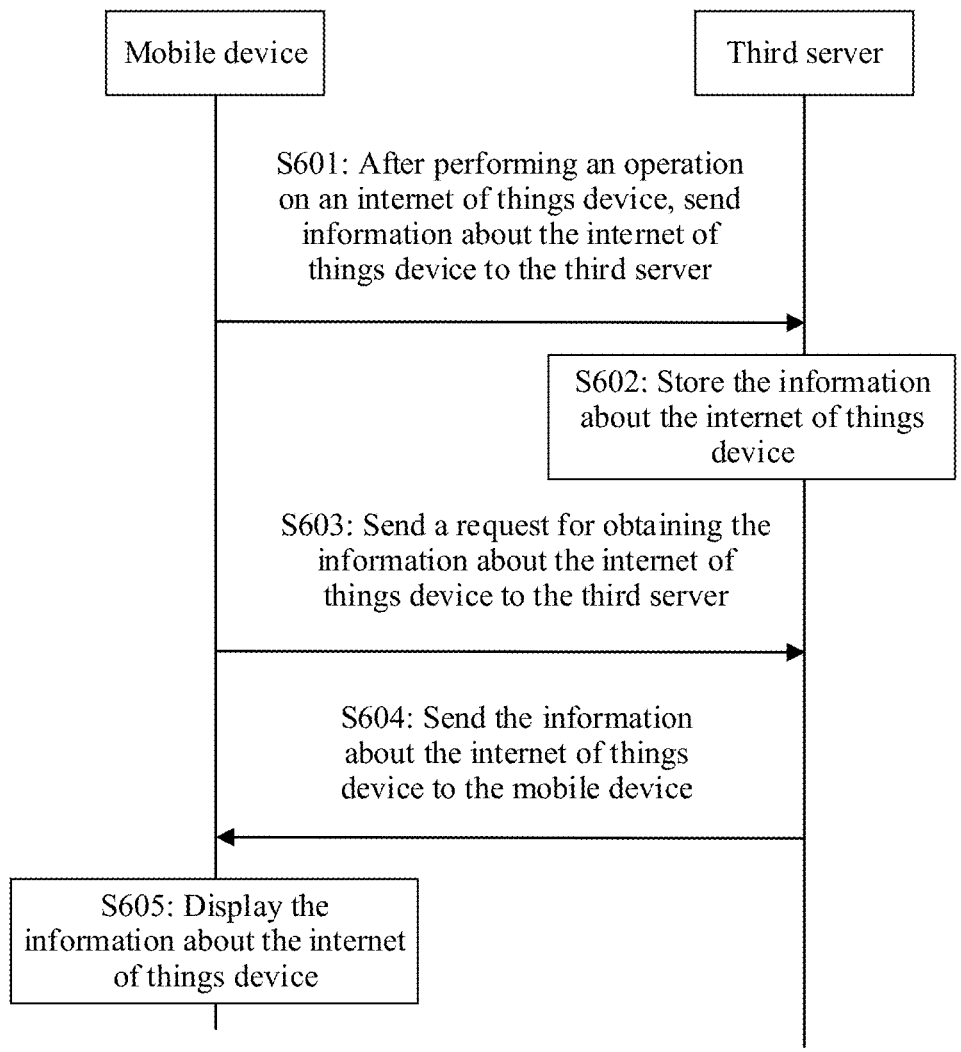
FIG. 18 is a signaling interaction diagram of a further network configuration method according to an embodiment of this application.

FIG. 18 is a signaling interaction diagram of a further network configuration method according to an embodiment of this application. With reference to FIG. 18, the network configuration method in this application may include the following steps.

S601: After performing an operation on an internet of things device, a mobile device sends information about the internet of things device to a third server.

S602: The third server stores the information about the internet of things device.

S603: The mobile device sends a request for obtaining the information about the internet of things device to the third server.

S604: The third server sends the information about the internet of things device to the mobile device.

S605: The mobile device displays the information about the internet of things device.

Compared with the conventional technology, in this embodiment of this application, information such as a historical operation of the internet of things device may be displayed to a user, so that the user can be more conveniently assisted in quickly finding the internet of things device.

For example, this application further provides a network configuration system, including a mobile device, a first server, a second server, and an internet of things device.

When the mobile device touches the internet of things device, the mobile device performs the foregoing network configuration method, the first server performs the foregoing network configuration method, and the second server performs the foregoing network configuration method.

For example, this application further provides a network configuration device. The network configuration device may include at least one memory and at least one processor. The memory is configured to store program instructions. The processor is configured to invoke the program instructions in the memory to enable a first device to perform the network configuration method in the foregoing embodiment.

For example, this application further provides a computer program product, including executable instructions. The executable instructions are stored in a readable storage medium. At least one processor of an electronic device may read the executable instructions from the readable storage medium. The at least one processor executes the executable instructions to enable the electronic device to implement the network configuration method in the foregoing embodiment.

For example, this application further provides a computer-readable storage medium. The computer-readable storage medium stores a computer program. When the computer program is executed by a processor, an electronic device performs the network configuration method in the foregoing embodiment.

In the foregoing embodiments, all or some of the functions may be implemented by using software, hardware, or a combination of software and hardware. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory (RAM), a magnetic disk, or an optical disc.

The invention claimed is:

1. A method implemented by a mobile device, wherein the method comprises:
    obtaining, by a first application of the mobile device, label information of an internet of things device to be network configured;
    obtaining, by the first application, information about a second application that is for configuring a network for the internet of things device;
    sending, by the first application and to a first service of the mobile device, a first message that indicates to start the first service and that comprises the information about the second application;
    discovering, by the first service, when the internet of things device is not network configured, the internet of things device;
    sending, by the first service and to a second service of the mobile device, a second message that indicates to start the second application and that comprises the information about the second application; and
    starting, by the second service, the second application based on the second message.

2. The method of claim 1, wherein before obtaining the information about the second application, the method further comprises sending, by the first application, an information obtaining request for the second application to a first server, wherein the information obtaining request comprises the label information.

3. The method of claim 2, wherein the information obtaining request further comprises a package name of the first application, and wherein the package name is for verifying whether the first application has permission to trigger the second application.

4. The method of claim 3, wherein after sending the information obtaining request to the first server, the method further comprises receiving, by the first application, from the first server, and when the first application does not have the permission to trigger the second application, an error prompt that indicates that the first application does not have the permission to trigger the second application.

5. The method of claim 3, wherein after sending the information obtaining request to the first server, the method further comprises receiving, by the first application, from the first server, and when the first application has the permission to trigger the second application, the information about the second application, wherein the information about the second application comprises an application package of the second application.

6. The method of claim 1, wherein discovering the internet of things device comprises:
    searching for, by the first service, the internet of things device; and
    establishing a connection between the first service and the internet of things device.

7. The method of claim 1, wherein method further comprises:
    sending, by the first service when the first service discovers the internet of things device, the information obtaining request to the internet of things device; and
    receiving, by the first service from the internet of things device, information about the internet of things device, wherein the information about the internet of things device comprises a serial number of the internet of things device, a session control identifier of the internet of things device, and a product identifier of the internet of things device.

8. A device, comprising:
    a first application;
    a first service;
    a second service;
    one or more processors, comprising a hardware processor, and configured to cause the device to:
        obtain, by the first application, label information of an internet of things device to be network configured;
        obtain, by the first application, information about a second application that is for configuring a network for the internet of things device;
        send, by the first application and to the first service, a first message that indicates to start the first service and that comprises the information about the second application;
        discover, by the first service, when the internet of things device is not network configured, the internet of things device;
        send, by the first service and to the second service, a second message that indicates to start the second application and that comprises the information about the second application; and
        start, by the second service and based on the second message, the second application.

9. The device of claim 8, wherein the one or more processors are further configured to cause the device to send, by the first application and to a first server, an information obtaining request for the second application, wherein the information obtaining request comprises the label information of the internet of things device.

10. The device of claim 9, wherein the information obtaining request further comprises a package name of the first application, and wherein the package name is for verifying whether the first application has permission to trigger the second application.

11. The device of claim 10, wherein the one or more processors are further configured to cause the device to receive, by the first application, from the first server, and when the first application does not have the permission to trigger the second application, an error prompt that indicates that the first application does not have the permission to trigger the second application.

12. The device of claim 10, wherein the one or more processors are further configured to cause the device to receive, by the first application, from the first server, and when the first application has the permission to trigger the second application, the information about the second application, and wherein the information about the second application comprises an application package of the second application.

13. The device of claim 8, wherein the one or more processors are configured to cause the device to:
    search, by the first service, for the internet of things device; and
    establish a connection between the first service and the internet of things device.

14. The device of claim 8, wherein the one or more processors are configured to cause the device to:
    send, by the first service, to the internet of things device, and when the internet of things device is network configured, an information obtaining request, or send, by the first service, to the internet of things device, and when the first service discovers the internet of things device, the information obtaining request; and
    receive, by the first service and from the internet of things device, information about the internet of things device, wherein the information about the internet of things device comprises a serial number of the internet of things device, a session control identifier of the internet of things device, and a product identifier of the internet of things device.

15. A non-transitory processor-readable medium comprising one or more program instructions that, when executed by one or more processors, cause a mobile device to:
  obtain, by a first application of the mobile device, label information of an internet of things device to be network configured;
  obtain, by the first application, information about a second application, wherein the second application is for configuring a network for the internet of things device;
  send, by the first application and to a first service of the mobile device, a first message to that indicates to start the first service and that comprises the information about the second application;
  discover, by the first service, when the internet of things device is not network configured, the internet of things device;
  send, by the first service and to a second service of the mobile device, a second message that indicates to start the second application and that comprises the information about the second application; and
  start, by the second service, the second application based on the second message.

16. The non-transitory processor-readable medium of claim 15, wherein when executed by the one or more processors, the one or more program instructions further cause the mobile device to send, by the first application to a first server, an information obtaining request for the second application, and wherein the information obtaining request comprises the label information.

17. The non-transitory processor-readable medium of claim 16, wherein the information obtaining request further comprises a package name of the first application, and wherein the package name is for verifying whether the first application has permission to trigger the second application.

18. The non-transitory processor-readable medium of claim 17, wherein the one or more program instructions further cause the mobile device to receive, by the first application and from the first server, an error prompt when the first application does not have the permission to trigger the second application, and wherein the error prompt indicates that the first application does not have the permission to trigger the second application.

19. The non-transitory processor-readable medium of claim 15, wherein the one or more program instructions further cause the mobile device to:
  search, by the first service, for the internet of things device; and
  establish a connection between the first service and the internet of things device.

20. The non-transitory processor-readable medium of claim 15, wherein the one or more program instructions further cause the mobile device to:
  send, by the first service, to the internet of things device, and when the internet of things device is network configured, an information obtaining request, or send, by the first service, to the internet of things device, and when the first service discovers the internet of things device, the information obtaining request; and
  receive, by the first service and from the internet of things device, information about the internet of things device, wherein the information about the internet of things device comprises a serial number of the internet of things device, a session control identifier of the internet of things device, and a product identifier of the internet of things device.

* * * * *

UNITED STATES PATENT AND TRADEMARK OFFICE
CERTIFICATE OF CORRECTION

| | |
|---|---|
| PATENT NO. | : 11,991,040 B2 |
| APPLICATION NO. | : 18/182112 |
| DATED | : May 21, 2024 |
| INVENTOR(S) | : Banghong Liu et al. |

It is certified that error appears in the above-identified patent and that said Letters Patent is hereby corrected as shown below:

In the Claims

Claim 15, Column 43, Line 4: "Anon-transitory" should read "A non-transitory"

Signed and Sealed this
Third Day of December, 2024

Katherine Kelly Vidal
*Director of the United States Patent and Trademark Office*